United States Patent
Thompson

(10) Patent No.: US 12,397,586 B2
(45) Date of Patent: Aug. 26, 2025

(54) NON-PNEUMATIC TIRE FOR CAMBER-STEERED VEHICLE OR OTHER VEHICLE

(71) Applicant: CAMSO INC., Magog (CA)

(72) Inventor: Ronald H. Thompson, Marietta, SC (US)

(73) Assignee: Camso Inc., Magog (CA)

( * ) Notice: Subject to any disclaimer, the term of this patent is extended or adjusted under 35 U.S.C. 154(b) by 1089 days.

(21) Appl. No.: 17/276,363

(22) PCT Filed: Sep. 13, 2019

(86) PCT No.: PCT/CA2019/051303
§ 371 (c)(1),
(2) Date: Mar. 15, 2021

(87) PCT Pub. No.: WO2020/051715
PCT Pub. Date: Mar. 19, 2020

(65) Prior Publication Data
US 2022/0072907 A1 Mar. 10, 2022

Related U.S. Application Data

(60) Provisional application No. 62/731,220, filed on Sep. 14, 2018.

(51) Int. Cl.
  *B60C 7/14* (2006.01)
  *B60C 7/10* (2006.01)
  *B60C 7/24* (2006.01)

(52) U.S. Cl.
  CPC .............. *B60C 7/143* (2013.01); *B60C 7/107* (2021.08); *B60C 7/24* (2013.01); *B60C 2200/10* (2013.01); *B60C 2200/12* (2013.01)

(58) Field of Classification Search
  CPC .......... B60C 7/143; B60C 7/107; B60C 7/24; B60C 7/22; B60C 7/18; B60C 7/102; B60C 2200/12
  See application file for complete search history.

(56) References Cited

U.S. PATENT DOCUMENTS

| | | |
|---|---|---|
| 4,345,633 A | 8/1982 | Gilmore |
| 6,450,222 B1 | 9/2002 | Fleming |
| (Continued) | | |

FOREIGN PATENT DOCUMENTS

| | | |
|---|---|---|
| WO | 2017106723 A1 | 6/2017 |
| WO | 2018111339 A1 | 6/2018 |
| (Continued) | | |

OTHER PUBLICATIONS

EP Supplemental Search Report for EP 19 85 9164 dated Jun. 9, 2022.
(Continued)

*Primary Examiner* — Kip T Kotter
(74) *Attorney, Agent, or Firm* — Hahn Loeser & Parks LLP

(57) ABSTRACT

A wheel comprising a non-pneumatic tire for a vehicle, such as a vehicle that is steerable and/or otherwise movable by leaning the vehicle (e.g., a bicycle, a motorcycle or another two-wheeled vehicle), in which the non-pneumatic tire may be designed to enhance its use and performance, including, for example, to avoid sudden failure, improve steering and/or other movement of the vehicle (e.g., when the vehicle is leaned and the non-pneumatic tire is cambered), improve ride comfort, and/or exhibit less rolling resistance.

26 Claims, 18 Drawing Sheets

(56) References Cited

U.S. PATENT DOCUMENTS

| | | |
|---|---|---|
| 6,769,465 B2 | 8/2004 | Rhyne et al. |
| 7,013,939 B2 | 3/2006 | Rhyne et al. |
| 7,159,632 B2 | 1/2007 | Fukui |
| 8,104,524 B2 | 1/2012 | Manesh et al. |
| 9,751,270 B2 | 9/2017 | Thompson |
| 2003/0213541 A1* | 11/2003 | Laurent .................... B60C 7/16 152/276 |
| 2004/0012246 A1 | 1/2004 | Rhyne et al. |
| 2013/0284329 A1 | 10/2013 | Wilson et al. |
| 2014/0367007 A1 | 12/2014 | Thompson |
| 2016/0250893 A1* | 9/2016 | Shoji ........................ B60C 7/18 152/80 |
| 2017/0136814 A1 | 5/2017 | Abe et al. |
| 2017/0341464 A1* | 11/2017 | Nishida .................... B60B 9/10 |
| 2017/0368881 A1 | 12/2017 | Shoji |
| 2018/0001699 A1 | 1/2018 | Shoji |
| 2020/0114687 A1 | 4/2020 | Thompson |

FOREIGN PATENT DOCUMENTS

| | | |
|---|---|---|
| WO | 2018112650 A1 | 6/2018 |
| WO | 2018207468 A1 | 11/2018 |
| WO | 2019119155 A1 | 6/2019 |

OTHER PUBLICATIONS

EP Opinion for EP 19 859 164.6 dated Jun. 9, 2022.
Torsion Equations—Roymech URL: https://www.roymech.co.uk/Useful_Tables/Torsion/Torsion.html [retrieved on Jun. 7, 2022].
Extended European Search Report dated Dec. 13, 2024.

\* cited by examiner

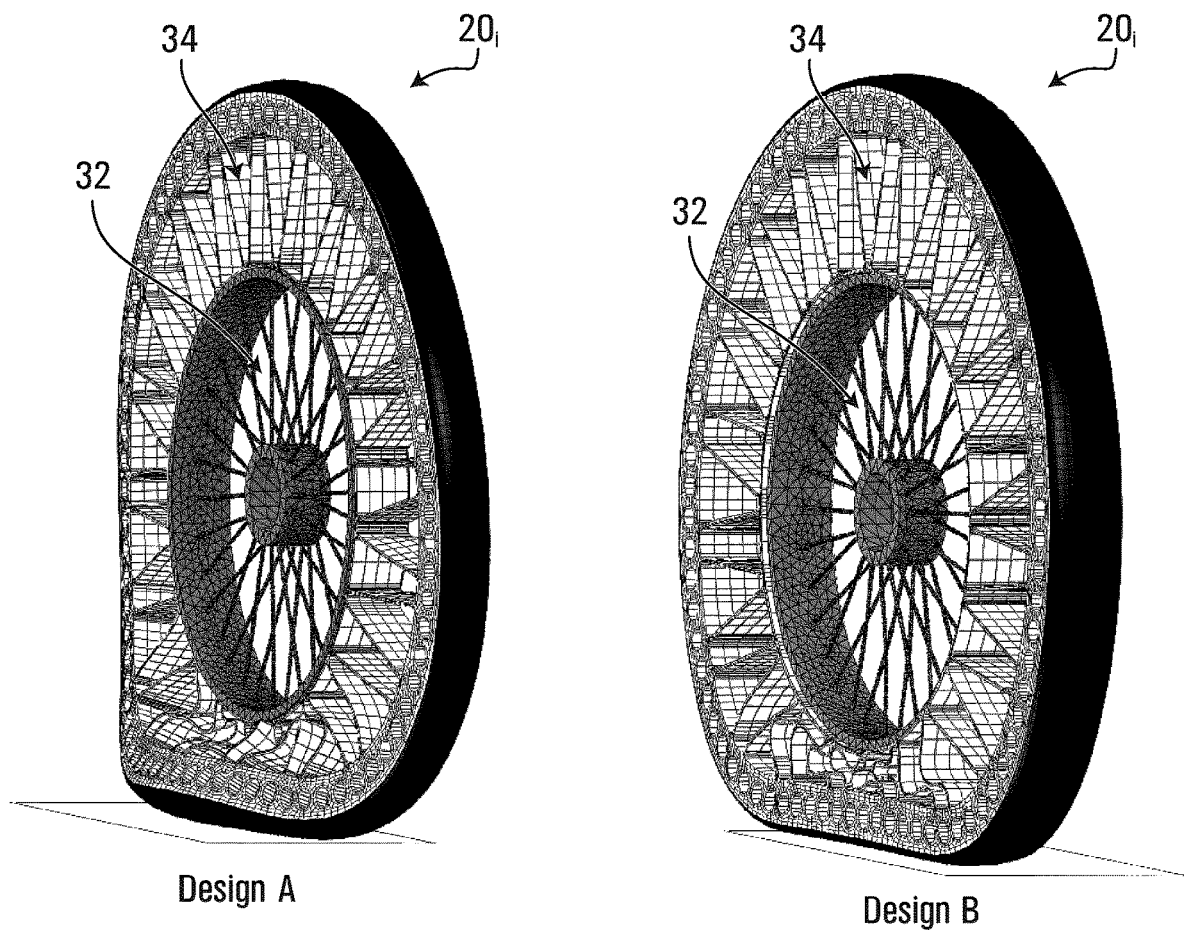
Design A
FIG. 9
Design B
FIG. 10
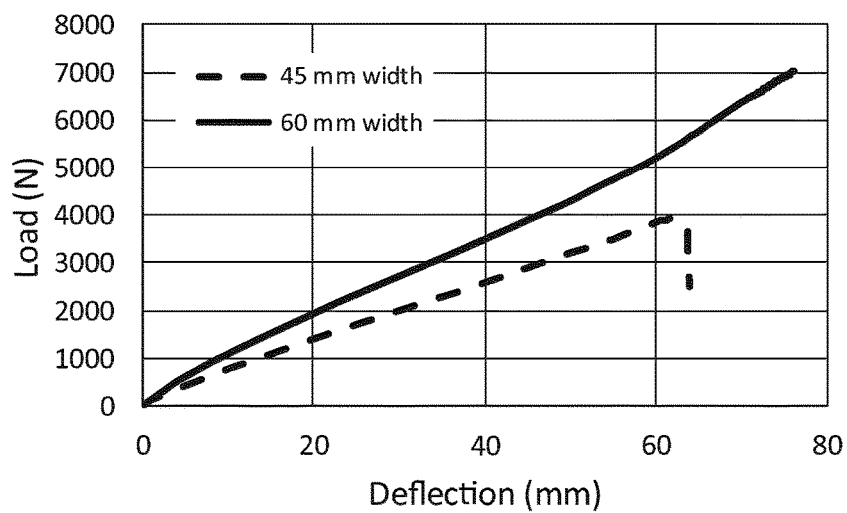
FIG. 11

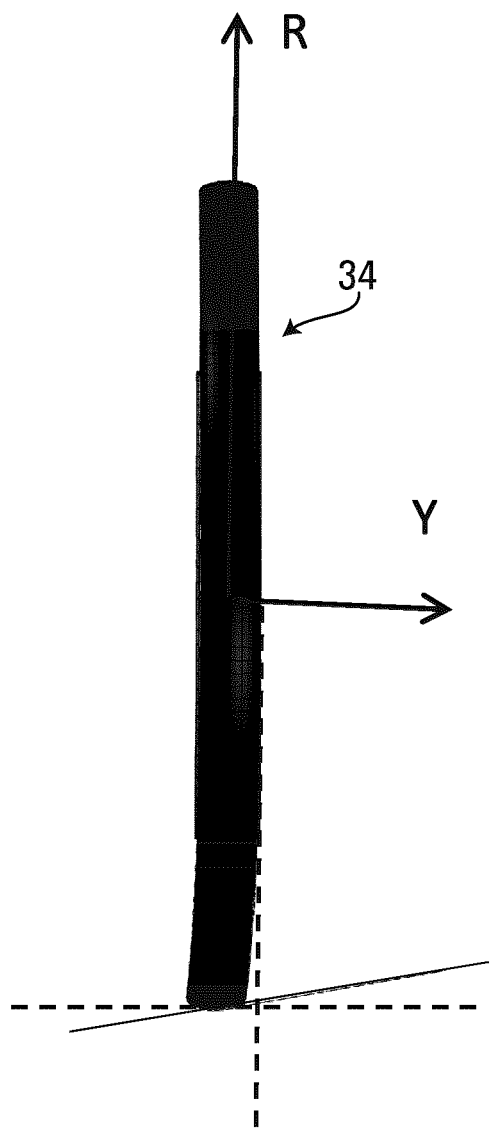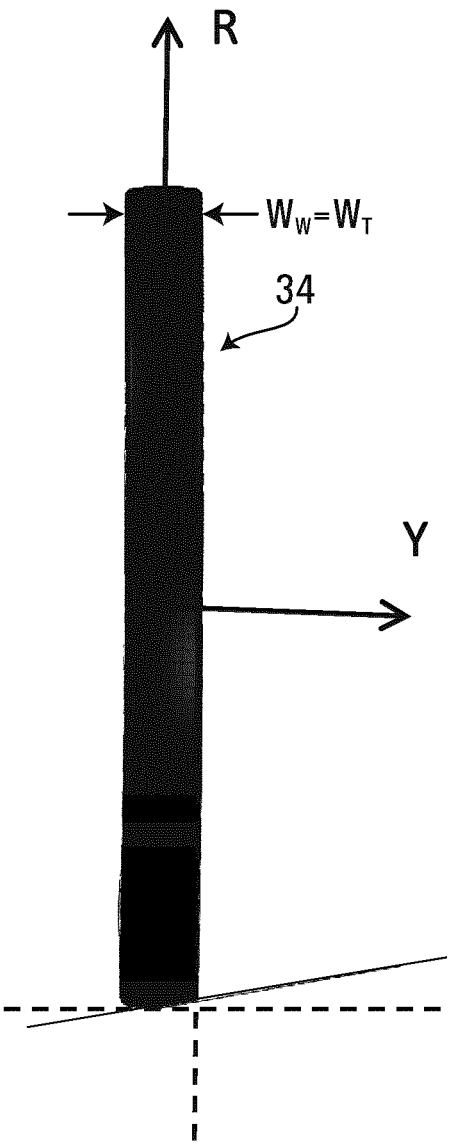
FIG. 12 — Significant lateral deflection when loaded on a 10 degree camber
FIG. 13 — Small lateral deflection when loaded on a 10 degree camber surface

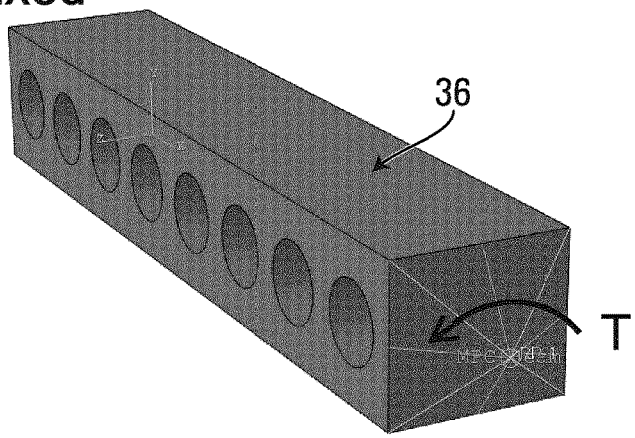
FIG. 16
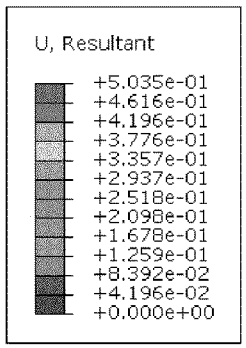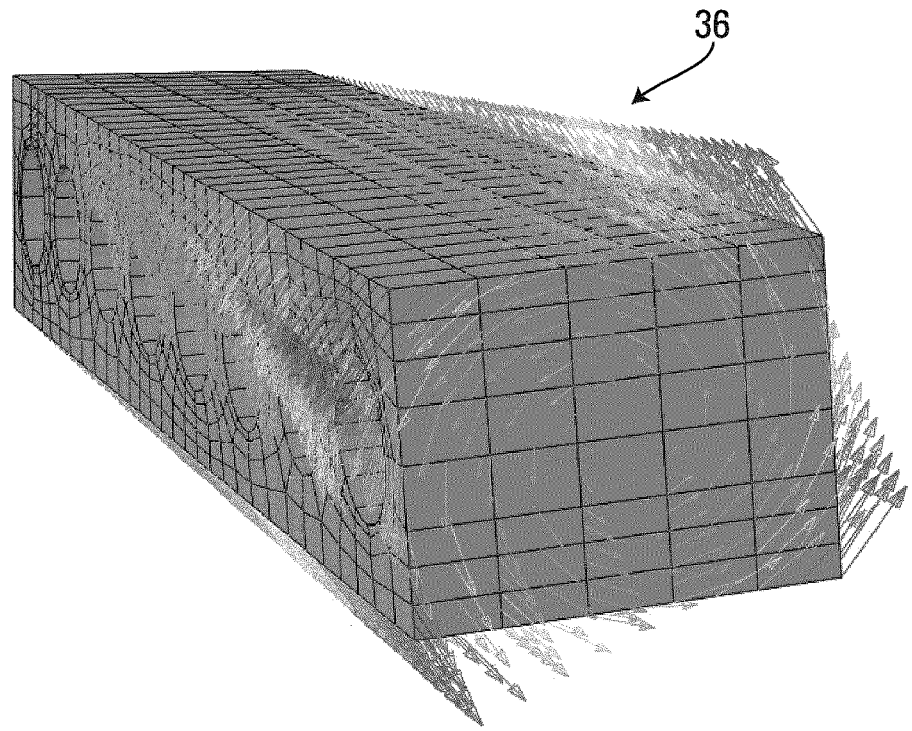
FIG. 17

NON-PNEUMATIC TIRE FOR CAMBER-STEERED VEHICLE OR OTHER VEHICLE

CROSS-REFERENCE TO RELATED APPLICATIONS APPLICATION

This application is a National Stage of international PCT Patent Application No. PCT/CA2019/051303 filed on Aug. 30, 2019, which claims priority from U.S. Provisional Patent Application 62/731,220 filed on Sep. 14, 2018. The contents of the aforementioned applications are hereby incorporated by reference herein.

FIELD

This disclosure relates to non-pneumatic tires (NPTs) for vehicles, including for camber-steered vehicles (e.g., two-wheeled vehicles, such as bicycles, electric bicycles, mopeds, and motorcycles, that develop a lean angle when cornering or otherwise moving).

BACKGROUND

Wheels for vehicles may comprise pneumatic tires or non-pneumatic tires, which are sometimes referred to as NPTs.

Pneumatic tires are often more prevalent in various applications due to several virtues (e.g., high vertical compliance, ability to develop a large contact area, etc.). They are mature products that have been refined over a very long time and inexpensive to produce.

For example, pneumatic tires were originally popularized for use on bicycles over 120 years ago. Reasons for their success compared to solid non-pneumatic tires included lower vertical stiffness, reduced rolling resistance, and lighter weight. These advantages were so overwhelming that inconveniences of a possible flat tire was an acceptable tradeoff.

There are current bicycle market trends that challenge traditional pneumatic tires. First, large cities across Europe, North America, and the Far East are developing public transportation systems incorporating large fleets of public-use bicycles. Compared to an automobile, a bicycle is compact, environmentally friendly, and inexpensive. Second, electric motors and batteries have reached a level of performance and price that enable integration of "E-bikes" (i.e., electric-assist bicycles) into public transit systems. This innovation greatly expands the utility of the bicycle for a larger portion of the population. GPS may be available on each E-bike, multiple charging stations are designed across urban areas, and there are wireless options for renting any E-bike connected to the transportation grid. Consequently, city municipalities and/or private companies may have to manage and maintain large E-bike fleets.

In addition to possible flats, the pneumatic tire always loses air pressure. With a high pressure, small-volume air chamber, the bicycle tire loses pressure much faster than an automotive tire. A standard 75-psi bicycle tire may have to be re-inflated approximately once per week, to maintain proper operating pressure. This negative attribute may be acceptable for an individual owner who assumes maintenance responsibility for his own property.

For a large fleet of bicycles, assuring proper operating conditions for each bicycle is incumbent on the fleet owner. Proper tire inflation becomes logistically difficult to manage in a fleet of several thousands of bicycles scattered over a large urban area. Thus, in this emerging market of high pressure, small volume tires used in fleet operations, there is a gap in market need and tire performance simply for maintenance reasons.

In addition to this, air-filled tires may go flat. When this occurs, the vehicle becomes inoperable. This is especially burdensome when the vehicle is a heavier E-bike or even an internal combustion vehicle like a moped or scooter.

Non-pneumatic tires (NPTs) for camber steer vehicles have been contemplated. These non-pneumatic tires fall into the category of "bottom loaders." A bottom loader is a non-pneumatic tire that transmits load from the ground to a central rim via compressive forces.

U.S. Pat. No. 7,159,632 is one example. In this case, the bicycle tire is a solid body of toroidal shape, configured to attach to a special rim. There are numerous versions of such structures, using rubber, foam rubber, or other elastomers for the solid tire structure.

U.S. Pat. No. 6,450,222 is an example of an improvement on this concept, in which two or more materials are used in the solid elastomer. The structure is still compression-based but offers further optimization due to having multiple materials.

U.S. Pat. No. 4,345,633 is yet another example of a possible improvement. The tire structure is still compression based, yet the tire has an inner cavity with a webbing that may add compliance and reduce weight. The structure, however, still works in compression, and any compliance is limited to the design space of the tire structure.

Various solutions exist in the market that mitigate problems associated with pressurized bicycle and motorcycle tires. For example, gel-type sealants may be added to the air chamber that provide resistance to punctures. Other market concepts consist of a high modulus tape that can be adhered to the inside of a pneumatic tire. This tape provides a measure of resistance to punctures. These products, however, only address the problems associated with flats, not with air pressure maintenance itself.

Solid rubber tires for camber steer vehicles result in a stiffer ride. In the case of most bicycles and E-bikes, the vehicle has no suspension. Thus, a stiffer ride may be a somewhat serious detriment to overall ride comfort. Flat proofing with gel or high modulus tape require manual installation and only seek to address the problem with flats.

NPTs that work primarily in tension have also been developed. U.S. Pat. Nos. 8,104,524, 6,769,465 and 7,013,939 disclose NPTs comprising a circumferentially reinforced band connected to a central hub via deformable connecting elements that function primarily in tension. Such tension-based NPTs hold promise for being able to function more similarly to pneumatic tires.

More recently, a tension-based NPT has been disclosed that may not comprise circumferential reinforcement. U.S. Pat. No. 9,751,270 discloses an NPT comprising an annular beam that may not comprise circumferential reinforcement. Instead, complex geometries are disclosed that enable a composite-like response to a structure that can be constructed from isotropic materials, including elastomers. When subjected to a radial load, this annular beam deflects in the contact patch, like a beam in transverse deflection. The design elements that connect the beam to a central part develop tension forces that transmit contact forces.

However, the tire geometries disclosed in the aforementioned patents have a width that is significant in relation to the tire diameter. For example, U.S. Pat. No. 9,751,270 discusses a design process for a tire having a diameter of 250 mm and a width of 95 mm. The ratio of the width to the diameter is 95/250=38%. The tire width is 38% of the tire diameter. Such a tire geometry would not function well for a camber steer vehicle.

A camber steer vehicle requires a tire that is tall and narrow. For example, a common E-bike tire size is 2.0" wide×26" diameter. This is a ratio 7.6%. This ratio may be as small as 4% for some high performance bicycle tires, and as large as 25% for some scooter and motorcycle tires.

Camber steer vehicles have two wheels that are in-line. They are dynamically stable; i.e., the vehicle requires input from the rider to remain upright. Tire performance plays a role in this stability. As such, a non-pneumatic tire for a camber steer vehicle requires unique performance attributes that have not been disclosed for a tension-based non-pneumatic tire.

Similar considerations may sometimes arise in respect of non-pneumatic tires for other types of vehicles.

For these and other reasons, there is a need for improvements in wheels comprising non-pneumatic tires for bicycles, motorcycles and other camber-steered vehicles, as well as for other vehicles.

SUMMARY

According to various aspects, this disclosure relates to a wheel comprising a non-pneumatic tire for a vehicle, such as a vehicle that is steerable and/or otherwise movable by leaning the vehicle (e.g., a bicycle, a motorcycle or another two-wheeled vehicle), in which the non-pneumatic tire may be designed to enhance its use and performance, including, for example, to avoid sudden failure, improve steering and/or other movement of the vehicle (e.g., when the vehicle is leaned and the non-pneumatic tire is cambered), improve ride comfort, and/or exhibit less rolling resistance.

For example, according to one aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. A torsional rigidity of the annular beam is sufficient to achieve the camber angle of the non-pneumatic tire when the vehicle is leaned.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. A torsional rigidity of the annular beam is sufficient to minimize torsional deflection of the annular beam when the vehicle is leaned.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. A ratio of a torsional rigidity of the annular beam over a rated load of the non-pneumatic tire is at least 1.5E4 N-mm$^2$/N.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. The annular support is resiliently deformable such that, when the non-pneumatic tire is loaded, an upper portion of the annular support above an axis of rotation of the non-pneumatic tire is in tension.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. A ratio of an outer diameter of the non-pneumatic tire over a width of the non-pneumatic tire is at least four.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. The non-pneumatic tire allows a ratio of a radial deflection of the non-pneumatic tire over a radius of the non-pneumatic tire to be at least 18%.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; an annular support disposed radially inwardly of the annular beam and configured to resiliently deform as the non-pneumatic tire engages the ground surface; and a tread disposed radially outwardly of the annular beam. A profile of the tread in a widthwise direction of the non-pneumatic tire is configured such that, when the ground surface is substantially flat and the camber angle of the non-pneumatic tire is 10 degrees, a tangent point of the tread with the ground surface is at a distance of at least 25% of a width of the tread from a centerline of the tread.

According to another aspect, this disclosure relates to a non-pneumatic tire for a vehicle on a ground surface. The vehicle is movable by leaning to create a camber angle of the non-pneumatic tire. The non-pneumatic tire comprises: an annular beam configured to deflect at a contact patch of the non-pneumatic tire with the ground surface; and an annular support disposed radially inwardly of the annular beam and configured to resiliently deform as the non-pneumatic tire engages the ground surface. A coefficient of rolling resistance of the non-pneumatic tire is no more than 0.08.

According to another aspect, this disclosure relates to a wheel for a vehicle on a ground surface. The vehicle is movable by leaning to create a camber angle of the non-pneumatic tire. The wheel comprises a non-pneumatic tire comprising: an annular beam configured to deflect at a contact patch of the non-pneumatic tire with the ground surface; and an annular support disposed radially inwardly of the annular beam and configured to resiliently deform as the non-pneumatic tire engages the ground surface.

The wheel comprises a hub disposed radially inwardly of the non-pneumatic tire. A torsional rigidity of the wheel about an axis of rotation of the wheel is at least 1.1 E5 N-mm/radian.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A ratio of a width of the non-pneumatic tire over an outer diameter of the non-pneumatic tire is no more than 0.25. A ratio of a torsional rigidity of the annular beam to a rated load of the non-pneumatic tire is no less than 1.16E4 N-mm$^2$/N.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A ratio of a width of the non-pneumatic tire over an outer diameter of the non-pneumatic tire is no more than 0.10. A ratio of an axial stiffness of the non-pneumatic tire to a radial stiffness of the non-pneumatic tire is no less than 0.8, when loaded to a rated load.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A ratio of a width of the non-pneumatic tire over a diameter of the non-pneumatic tire is no more than 0.10. A coefficient of rolling resistance of the non-pneumatic tire is no more than 0.012, when loaded to a rated load at a speed of 20 kph.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A hub comprising a rim is disposed radially inwardly of the annular support. The non-pneumatic tire comprises a tread disposed radially outwardly from the annular beam. A ratio of a mass of the non-pneumatic tire and the hub to a rated load of the non-pneumatic tire and the hub is no less than 20. The non-pneumatic tire is interchangeable with the rim of the hub.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension.

The non-pneumatic tire comprises a tread disposed radially outwardly of the annular beam. A ratio of a width of the non-pneumatic tire over an outer diameter of the non-pneumatic tire is no more than 0.10. A ratio of a vertical stiffness of the non-pneumatic tire to a rated load of the non-pneumatic tire is no more than 0.12 N/mm/N.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension.

The non-pneumatic tire comprises a tread disposed radially outwardly of the annular beam. A ratio of a width of the non-pneumatic tire over an outer diameter of the non-pneumatic tire is no more than 0.10. An axial distance from a centerline of the non-pneumatic tire to a tangent point between a radially outer profile of the tread and a line at a 10-degree angle from an axial direction is no less than 25% of a width of the tread.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A hub comprising a rim is disposed radially inwardly of the annular support. A ratio of an outer diameter of the hub to an outer diameter of the non-pneumatic tire is no more than 0.75.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A hub comprising a rim is disposed radially inwardly of the annular support. The hub comprises high modulus spokes extending radially from a central portion to an outer portion. The central portion of the hub is configured to contain bearings and an axle.

According to another aspect, this disclosure relates to a non-pneumatic tire for a camber steer vehicle. The non-pneumatic tire comprises an annular beam configured to deflect at a contact patch of the non-pneumatic tire and an annular support extending radially inwardly from the annular beam and configured to support loading by tension. A hub comprising a rim is disposed radially inwardly of the annular support. The non-pneumatic tire comprises a tread disposed radially outwardly from the annular beam. A torsional stiffness of the non-pneumatic tire and the hub is no less than 1.1E6 N-mm/radian, when loaded to a rated load.

According to another aspect, this disclosure relates to a non-pneumatic tire for a vehicle on a ground surface. The non-pneumatic tire comprises an annular beam configured to deflect at a contact patch of the non-pneumatic tire with the ground surface and an annular support disposed radially inwardly of the annular beam and configured to resiliently deform as the non-pneumatic tire engages the ground surface. The non-pneumatic tire comprises a tire material constituting at least a majority of the annular beam. The tire material is at least mostly non-elastomeric.

According to another aspect, this disclosure relates to a non-pneumatic tire for a vehicle on a ground surface. The non-pneumatic tire comprises an annular beam configured to deflect at a contact patch of the non-pneumatic tire with the ground surface and an annular support disposed radially inwardly of the annular beam and configured to resiliently deform as the non-pneumatic tire engages the ground surface. The non-pneumatic tire comprises a tire material constituting at least a majority of the annular beam. The tire material comprises polyamide.

According to another aspect, this disclosure relates to a non-pneumatic tire for a vehicle on a ground surface. The non-pneumatic tire comprises an annular beam configured to deflect at a contact patch of the non-pneumatic tire with the ground surface and an annular support disposed radially inwardly of the annular beam and configured to resiliently deform as the non-pneumatic tire engages the ground surface. The non-pneumatic tire comprises a tire material constituting at least a majority of the annular beam. The tire material comprises a polyamide-based alloy.

According to another aspect, this disclosure relates to a non-pneumatic tire for a vehicle on a ground surface. The non-pneumatic tire comprises an annular beam configured to deflect at a contact patch of the non-pneumatic tire with the ground surface and an annular support disposed radially inwardly of the annular beam and configured to resiliently deform as the non-pneumatic tire engages the ground surface. The annular beam comprises a first plurality of blind openings that extend from a first lateral side of the annular beam without reaching a second lateral side of the annular beam that is opposite to the first lateral side of the annular beam and a second plurality of blind openings that extend from the second lateral side of the annular beam without reaching the first lateral side of the annular beam.

According to another aspect, this disclosure relates to a non-pneumatic tire for a vehicle on a ground surface. The non-pneumatic tire comprises an annular beam configured to deflect at a contact patch of the non-pneumatic tire with the ground surface and an annular support disposed radially inwardly of the annular beam and configured to resiliently deform as the non-pneumatic tire engages the ground surface. The annular beam comprises a plurality of openings and a plurality of interconnecting members between respective ones of the openings. Each interconnecting member includes a first end portion, a second end portion, and an intermediate portion that is disposed between the first end portion and the second end portion of the interconnecting member and is narrower than the first end portion and the second end portion of the interconnecting member in a circumferential direction of the non-pneumatic tire.

These and other aspects of this disclosure will now become apparent to those of ordinary skill in the art upon review of a description of embodiments in conjunction with the accompanying drawings.

BRIEF DESCRIPTION OF THE DRAWINGS

A detailed description of embodiments is provided below, by way of example only, with reference to the accompanying drawings, in which:

FIGS. 9 and 10 show an example of behavior of two versions of wheels such as the wheel of FIG. 2 under high load;

FIG. 11 shows an example of a relationship of load vs. deflection for the two versions of wheels;

FIGS. 12 and 13 show an example of axial deflection of the tire with camber angle, for the two versions of wheels;

FIGS. 16 and 17 show an example of loading and results for the FEA;

Figure 1:
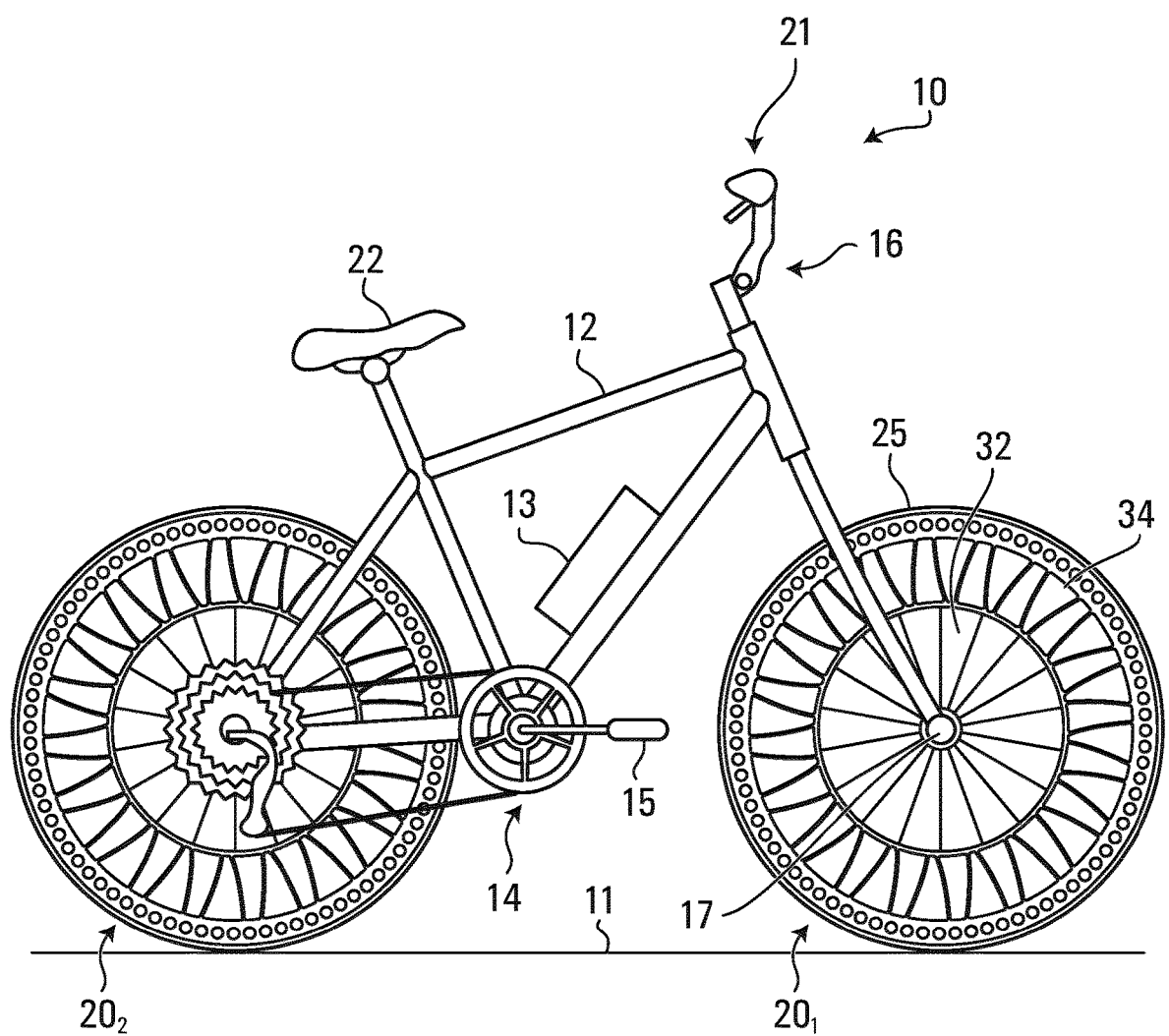
FIG. 1 shows an example of an embodiment of a vehicle steerable and/or otherwise movable by leaning the vehicle and comprising wheels that include non-pneumatic tires.
Figure 2:
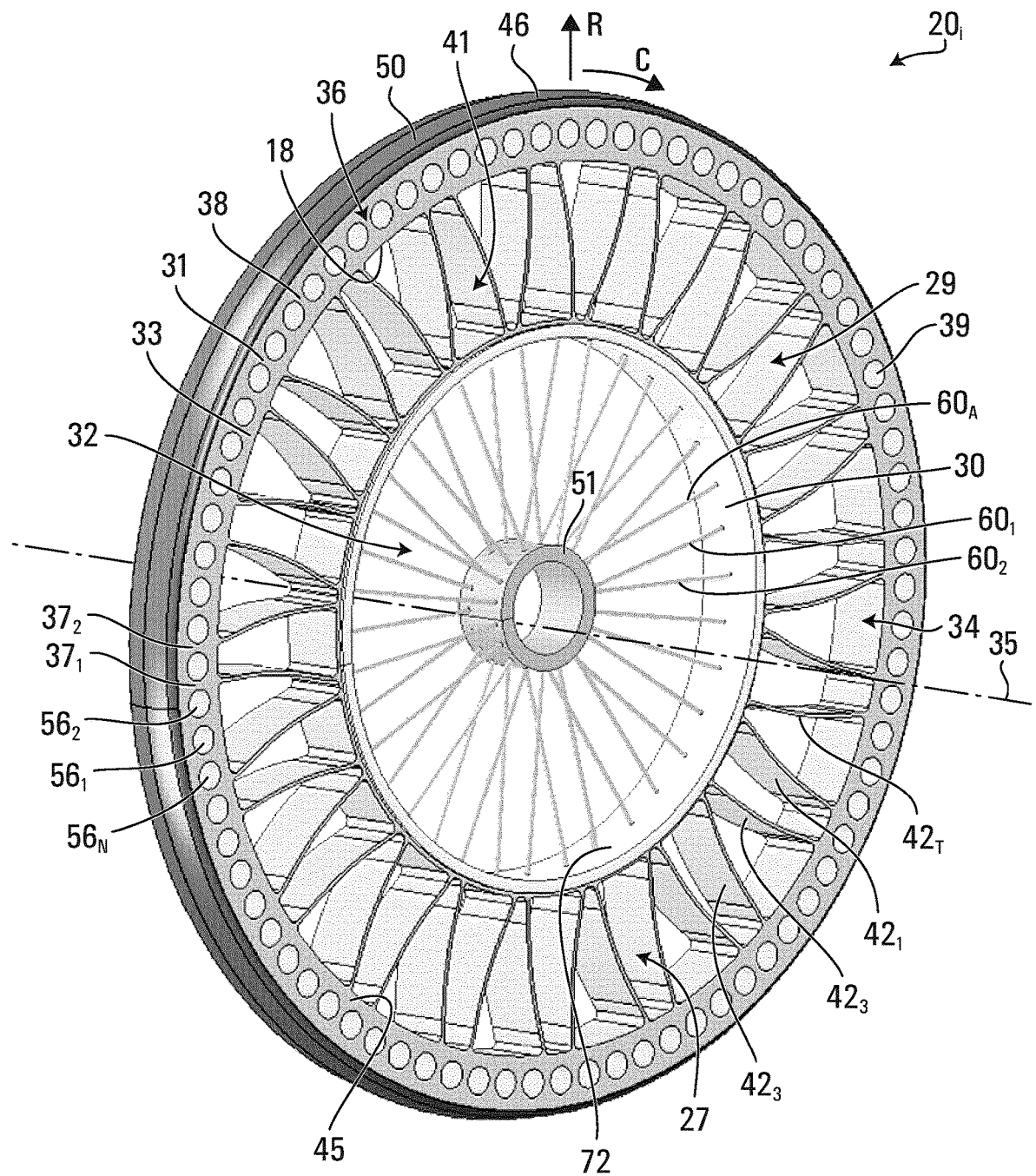
FIG. 2 shows a wheel including a non-pneumatic tire of the vehicle.

It is to be expressly understood that the description and drawings are only for purposes of illustrating certain embodiments and are an aid for understanding. They are not intended to and should not be limiting.

DETAILED DESCRIPTION OF EMBODIMENTS

FIGS. 1 to 7 show an example of an embodiment of a vehicle 10 comprising wheels $20_1$, $20_2$ on a ground surface 11 (e.g., a road, a trail, etc.). In this embodiment, the vehicle 10 is a camber-steered vehicle that is steerable by cambering the wheels $20_1$, $20_2$, i.e., creating a camber angle β of each of the wheels $20_1$, $20_2$ relative to a plane V normal to the ground surface 11, when leaning the vehicle 10 at a lean angle α that corresponds to the camber angle β (i.e., α=β). More particularly, in this embodiment, the camber-steered vehicle 10 is a bicycle.

As further discussed later, in this embodiment, the wheels $20_1$, $20_2$ are non-pneumatic (i.e., airless) and may be designed to enhance their use and performance, including, for example, to avoid sudden failure, improve steering and/or other movement of the bicycle 10 when the bicycle 10 is leaned and they are cambered, improve ride comfort, and/or exhibit less rolling resistance.

In addition to its wheels $20_1$, $20_2$, in this embodiment, the bicycle 10 comprises a frame 12, a powertrain 14, a steering system 16, a braking system 21, and a seat 22 (e.g., a straddle seat) allowing a user, who may also be referred to as a "rider" or "cyclist", to ride the bicycle 10 on the ground surface 11. The bicycle 10 has a longitudinal direction, a widthwise direction, and a heightwise direction.

The powertrain 14 is configured to apply power to the wheels $20_1$, $20_2$ to propel the bicycle 10 on the ground surface 11. In this embodiment, as the bicycle 10 is human-powered by the user, the powertrain 14, which may also be referred to as a drivetrain, is configured to transmit power from the user to the wheels $20_1$, $20_2$ to propel the bicycle 10. In this example, the powertrain 14 comprises pedals 15 configured to be engaged by the user to pedal and a transmission 19 (e.g., a chain drive, derailleur, etc.) to transmit power from the pedals 15 to a rear one of the wheels $20_1$, $20_2$ that is a drive wheel. Also, in this embodiment, the powertrain 14 comprises a power source 13 (e.g., a primer mover) that includes one or more motors, which may partially power the vehicle 10 instead of or in addition to human-powering from pedaling. For instance, in some embodiments, the power source 13 may comprise an electric motor (e.g., powered by a battery), an internal combustion engine, or a combination of different types of motor (e.g., an internal combustion engine and an electric motor). The powertrain 14 can transmit power from the power source 13 to one or more of the wheels $20_1$, $20_2$ in any suitable way (e.g., via the transmission 19, a shaft engaging (i.e., directly connecting) a motor and a given one of the wheels $20_1$, $20_2$, etc.). In this case, the power source 13 comprises an electric motor such that the bicycle 10 is an electric bike.

The steering system 16 is configured to steer the bicycle 10 on the ground surface 11. In this embodiment, the steering system 16 is configured to turn a front one of the wheels $20_1$, $20_2$ to change its orientation relative to the frame 12 of the bicycle 10 in order to cause the bicycle 10 to move in a desired direction. Also, the bicycle 10 can be steered by the user leaning laterally to a side of the bicycle 10 in which he/she desires to turn at the lean angle α that corresponds to the camber angle β of each of the wheels $20_1$, $20_2$.

The wheels $20_1$, $20_2$ engage the ground surface 11 for traction of the bicycle 10. Each wheel $20_i$ comprises a non-pneumatic tire 34 for contacting the ground surface 11 and a hub 32 for connecting the wheel $20_i$ to an axle 17. The non-pneumatic tire 34 is a compliant wheel structure that is not supported by gas (e.g., air) pressure and that is resiliently deformable (i.e., changeable in configuration) as the wheel $20_i$ contacts the ground surface 11.

The wheel $20_i$ has an axis of rotation 35, which defines an axial direction (also referred to as a "Y" direction) parallel to the axis of rotation 35 of the wheel $20_1$, a vertical direction (also referred to as a "Z" direction) that is normal to the axis of rotation 35 of the wheel $20_1$, and a horizontal direction (also referred to as a "X" direction) that is normal to the axis of rotation 35 of the wheel $20_i$ and the vertical direction and can be viewed as corresponding to a heading direction of the wheel $20_i$. The axial direction of the wheel $20_i$ can also be referred to as a lateral or widthwise direction of the wheel $20_1$, while each of the vertical direction and the horizontal direction of the wheel $20_i$ is an example of a radial direction of the wheel $20_i$ (also referred to as a "R" direction) The wheel $20_i$ also has a circumferential direction (also referred to as a "C" direction). The wheel $20_i$ has an outer diameter $D_W$ and a width $W_W$. It comprises lateral sides 47, 49 that are opposite one another.

Similarly, the non-pneumatic tire 34 has an axial direction, a vertical direction and a horizontal direction that are each examples of a radial direction, and a circumferential direction, which respectively correspond to the axial direction, the vertical direction and the horizontal direction that are each an example of the radial direction, and the circumferential direction of the wheel $20_1$, has an inner diameter $D_{TI}$, an outer diameter $D_T$, and a width $W_T$, and comprises lateral sides 53, 57 which are opposite one another and respectively part of the lateral sides 47, 49 of the wheel $20_i$.

When it is in contact with the ground, the non-pneumatic tire 34 has an area of contact 25 with the ground surface 11, which may be referred to as a "contact patch" of the non-pneumatic tire 34 with the ground surface 11. The contact patch 25 of the non-pneumatic tire 34 has a dimension $L_C$, referred to as a "length", in the horizontal direction of the wheel $20_i$ and a dimension $W_C$, referred to as a "width", in the lateral direction of the wheel $20_i$.

In this embodiment, the non-pneumatic tire 34 may be tall and narrow, which is particularly useful for the bicycle 10 such as to facilitate steering by leaning and by reducing friction with the ground surface 11 when turning the front one of the wheels $20_1$, $20_2$. For example, in this embodiment, an aspect ratio of the outer diameter $D_T$ of the tire 34 over the width $W_T$ of the tire 34 may be at least four, in some cases at least six, in some cases at least ten, in some cases at least fourteen, and in some cases even more. For instance, in some embodiments, a size range for the non-pneumatic tire 34 may be such that its width $W_T$ is between 30 mm and 110 mm and its outer diameter $D_T$ is between 550 mm and 740 mm.

A rated load of the non-pneumatic tire 34, which refers to a load for which the non-pneumatic tire 34 is designed to operate properly such that it can properly support that load, and which may also be referred to as a "design load", have any suitable value. For instance, in some embodiments, the rated load of the tire 34 may be no more than 50 $kg_f$ (i.e., kilogram-force), in some cases no more than 100 $kg_f$, in some cases no more than 150 $kg_f$. For example, in some embodiments, the rated load of the tire 34 may be between 80 $kg_f$ and 120 $kg_f$. In various examples of implementation, the rated load of the non-pneumatic tire 24 may be indicated on the non-pneumatic tire 24 itself and/or conveyed as information regarding the non-pneumatic tire 24 by an entity, such as a manufacturer of the non-pneumatic tire 24 and/or the bicycle 10 (e.g., in a user manual, technical specifications, etc.).

In this embodiment, the non-pneumatic tire 34 comprises an annular beam 36 and an annular support 41 that is disposed between the annular beam 36 and the hub 32 of the wheel $20_i$ and configured to support loading on the non-pneumatic tire 34 as the non-pneumatic tire 34 engages the ground surface 11. More particularly, in this embodiment, the non-pneumatic tire 34 is tension-based such that the annular support 41 is configured to support the loading on the non-pneumatic tire 34 by tension. That is, under the loading on the non-pneumatic tire 34, the annular support 41 is resiliently deformable such that a lower portion 27 of the annular support 41 between the axis of rotation 35 of the non-pneumatic tire 34 and the contact patch 25 of the non-pneumatic tire 34 is compressed (e.g., with little reaction force vertically) and an upper portion 29 of the annular support 41 above the axis of rotation 35 of the non-pneumatic tire 34 is in tension to support the loading.

The annular beam 36 of the non-pneumatic tire 34 is configured to deflect under the loading on the non-pneumatic tire 34 at the contact patch 25 of the non-pneumatic tire 34 with the ground surface 11. For instance, the annular beam 36 functions like a beam in transverse deflection. An outer peripheral extent 46 of the annular beam 36 and an inner peripheral extent 48 of the annular beam 36 deflect at the contact patch 25 of the non-pneumatic tire 34 under the loading on the non-pneumatic tire 34. In this embodiment, the annular beam 36 is configured to deflect such that it applies a homogeneous contact pressure along the length $L_C$ of the contact patch 25 of the non-pneumatic tire 34 with the ground surface 11. The annular beam 36 has a radius $R_{BEAM}$ defined by its outer peripheral extent 36.

More particularly, in this embodiment, the annular beam 36 comprises a shear beam 39 configured to deflect predominantly by shearing at the contact patch 25 under the loading on the non-pneumatic tire 34. That is, under the loading on the non-pneumatic tire 34, the shear beam 39 deflects significantly more by shearing than by bending at the contact patch 25. The shear beam 39 is thus configured such that, at a center of the contact patch 25 of the non-pneumatic tire 34 in the circumferential direction of the non-pneumatic tire 34, a shear deflection of the shear beam 39 is significantly greater than a bending deflection of the shear beam 39. For example, in some embodiments, at the center of the contact patch 25 of the non-pneumatic tire 34 in the circumferential direction of the non-pneumatic tire 34, a ratio of the shear deflection of the shear beam 39 over the bending deflection of the shear beam 39 may be at least 1.2, in some cases at least 1.5, in some cases at least 2, in some cases at least 3, and in some cases even more (e.g., 4 or more). For instance, in some embodiments, the annular beam 36 may be designed based on principles discussed in U.S. Pat. No. 9,751,270, which is hereby incorporated by reference herein, in order to achieve the homogeneous contact pressure along the length $L_C$ of the contact patch 25 of the non-pneumatic tire 34 with the ground surface 11.

In this example of implementation, the shear beam 39 comprises an outer annular portion 31, an inner annular portion 33, and a shearing annular portion 38 between the outer annular portion 31 and the inner annular portion 33 that are configured to cause the shear beam 39 to deflect more by shearing than by bending at the contact patch 25 of the tire 34. In this embodiment, the shearing annular portion 38 comprises a plurality of voids $56_1$-$56_N$ between the outer annular portion 31 and the inner annular portion 33, which may be respectively referred to as an "outer band" 31 and an "inner band" 33 of the shear beam 39. The shear beam 39 also comprises a plurality of interconnecting members $37_1$-$37_P$ that extend between the outer band 31 and the inner band 33 and are disposed between respective ones of the voids $56_1$-$56_N$. The interconnecting members $37_1$-$37_P$ may be referred to as "webs" such that the shear beam 39 may be viewed as comprising "web-like" or "webbing" portions.

Each of the inner band 31 and the outer band 33 extends continuously in the circumferential direction of the non-pneumatic tire 34. A thickness $t_{BAND}$ of each of the inner band 33 and the outer band 33 in the radial direction of the tire 34 may have any suitable value. In various embodiments, the thickness $t_{BAND}$ of the inner band 33 and/or the thickness $t_{BAND}$ of the outer band 33 may be identical or different.

The voids $56_1$-$56_N$ of the shear beam 39 help the shear beam 39 to deflect predominantly by shearing at the contact patch 25 under the loading on the non-pneumatic tire 34. In this embodiment, the voids $56_1$-$56_N$ are openings that extend from one of the lateral sides 54, 49 to an opposite one of the lateral sides 54, 59 of the non-pneumatic tire 34. That is, the openings $56_1$-$56_N$ extend laterally though the shear beam 39 in the axial direction of the non-pneumatic tire 34. The openings $56_1$-$56_N$ may extend laterally without reaching one or both of the lateral sides 54, 49 of the non-pneumatic tire 34 in other embodiments. In this example, a cross-section of each of the openings $56_1$-$56_N$ is substantially circular. The cross-section of each of the openings $56_1$-$56_N$ may be shaped differently in other examples (e.g., oblong, polygonal, partly curved and partly straight, etc.). In some cases, different ones of the openings $56_1$-$56_N$ may have different shapes. In some cases, the cross-section of each of the openings $56_1$-$56_N$ may vary in the axial direction of the wheel $20_i$. For instance, in some embodiments, the openings $56_1$-$56_N$ may be tapered in the axial direction of the wheel $20_i$ such that their cross-section decreases inwardly axially (e.g., to help minimize debris accumulation within the openings $56_1$-$56_N$).

The shear beam 39, including the voids $56_1$-$56_N$ and the interconnecting members $37_1$-$37_P$ may be arranged in any other suitable way in other embodiments. For example, in other embodiments, the shear beam 39 may comprise one or more intermediate bands between the inner band 33 and the outer band 33, the voids $56_1$-$56_N$ and/or the interconnecting members $37_1$-$37_P$ may have any other suitable shapes, etc.

In this embodiment, the non-pneumatic tire 34 comprises a tread 50 for enhancing traction between the non-pneumatic tire 34 and the ground surface. The tread 50 is disposed about the outer peripheral extent 46 of the annular beam 36, in this case about the outer band 31 of the shear beam 39. The tread 50 may comprise a plurality of tread recesses and a plurality of tread projections such that each of the tread recesses is disposed between adjacent ones of the tread projections. The tread 50 may be implemented in any suitable way in other embodiments (e.g., may have a smooth outer surface without tread recesses or projections).

The annular support 41 is configured to support the loading on the non-pneumatic tire 34 as the non-pneumatic tire 34 engages the ground. As mentioned above, in this embodiment, the annular support 41 is configured to support the loading on the non-pneumatic tire 34 by tension. More particularly, in this embodiment, the annular support 41 comprises a plurality of support members $42_1$-$42_T$ that are distributed around the non-pneumatic tire 34 and resiliently deformable such that, under the loading on the non-pneumatic tire 34, lower ones of the support members $42_1$-$42_T$ in the lower portion 27 of the annular support 41 (between the axis of rotation 35 of the non-pneumatic tire 34 and the contact patch 25 of the non-pneumatic tire 34) are compressed and bend while upper ones of the support members $42_1$-$42_T$ in the upper portion 29 of the annular support 41 (above the axis of rotation 35 of the non-pneumatic tire 34) are tensioned to support the loading. As they support load by tension when in the upper portion 29 of the annular support 41, the support members $42_1$-$42_T$ may be referred to as "tensile" members.

In this embodiment, the support members $42_1$-$42_T$ are elongated and extend from the annular beam 36 towards the hub 32 generally in the radial direction of the non-pneumatic tire 34. In that sense, the support members $42_1$-$42_T$ may be referred to as "spokes" and the annular support 41 may be referred to as a "spoked" support.

More particularly, in this embodiment, the inner peripheral extent 48 of the annular beam 36 is an inner peripheral surface of the annular beam 36 and each spoke $42_i$ extends from the inner peripheral surface 48 of the annular beam 36 towards the hub 32 generally in the radial direction of the non-pneumatic tire 34 and from a first lateral end 55 to a second lateral end 58 in the axial direction of the non-pneumatic tire 34. In this case, the spoke $42_i$ extends in the axial direction of the non-pneumatic tire 34 for at least a majority of the width $W_T$ of the non-pneumatic tire 34. For instance, in some embodiments, the spoke $42_i$ may extend in the axial direction of the non-pneumatic tire 34 for more than half, in some cases at least 60%, in some cases at least 80%, and in some cases an entirety of the width $W_T$ of the non-pneumatic tire 34. Moreover, the spoke $42_i$ has a thickness $T_S$ measured between opposite surfaces 59, 61 of the spoke $42_i$ that is significantly less than a length and width of the spoke $42_i$.

When the non-pneumatic tire 34 is in contact with the ground and bears a load (i.e., part of a weight of the bicycle 10 and its user), respective ones of the spokes $42_1$-$42_T$ that are disposed in the upper portion 29 of the spoked support 41 (i.e., above the axis of rotation 35 of the non-pneumatic tire 34) are placed in tension while respective ones of the spokes $42_1$-$42_T$ that are disposed in the lower portion 27 of the spoked support 41 (i.e., adjacent the contact patch 25) are placed in compression. The spokes $42_1$-$42_T$ in the lower portion 27 of the spoked support 41 which are in compression bend in response to the load. Conversely, the spokes $42_1$-$42_T$ in the upper portion 29 of the spoked support 41 which are placed in tension support the load by tension.

The hub 32 is disposed centrally of the non-pneumatic tire 34 and connects the wheel $20_i$ to the axle 17. The hub 32 may be implemented in any suitable way. In this embodiment, the hub 32 comprises an outer ring 30, which can be referred to as a "rim", an inner hub member 51 disposed inwardly of and radially spaced from the rim 30, and a plurality of support members $60_1$-$60_A$ spaced apart circumferentially from one another and projecting radially outward from the inner hub member 60 to the rim 30. This may help to reduce a weight of the hub 32. In this example, the support members $60_1$-$60_A$ constitute "spokes" of the hub 32.

In this example of implementation, the hub 32 is rigid such that it substantially does not deform under loading in use. More particularly, in this embodiment, the rim 30 is significantly stiffer than the tire 34 and the spokes $60_1$-$60_A$ of the hub 32 are pretensioned, similar to spokes of a conventional bicycle wheel. This may create a structure that is very stiff in the radial and axial directions of the wheel $20_i$, yet lightweight.

Figure 25:
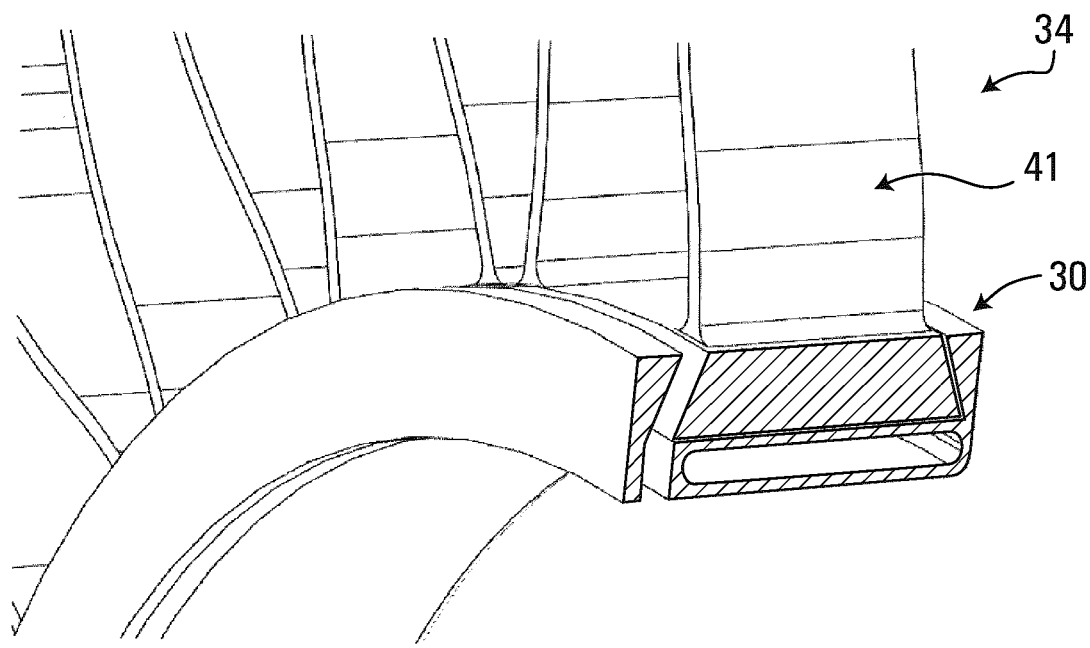
FIG. 25 shows an example of the non-pneumatic tire mounted to a hub.

In this embodiment, the rim 30 of the hub 32 and the spoked support 41 of the non-pneumatic tire 34 are configured to be attached to one another mechanically such that the non-pneumatic tire 34 is mountable to and dismountable from the rim 30 (e.g., to facilitate installation, replacement, repair, etc.). For instance, in some embodiments, as shown in FIG. 25, the rim 30 may comprise a flange 79 and the spoked support 41 of may comprise a base 77 that is connected to the flange 79. In this example, each of the base 77 and the flange 79 tapers in the radial direction of the wheel $20_i$. More particularly, in this case, the base 77 is dovetailed and received in the flange 79. The base 77 of the tire may thus include a dovetail shape and the flange 79 of the rim 30 may include a dovetail configuration as well, such that, when a detachable rim flange is affixed to the rim, the tire base is secured. The tire base fixation may be further enhanced using any other suitable means. For example, in some embodiments, fasteners (e.g., screws or other threaded fasteners, adhesives) may be employed, in addition to or instead of a dovetail design.

Also, in this embodiment, the hub 32 may be configured to accommodate part of the transmission 19 (e.g., part of the chain drive, derailleur, etc.) of the powertrain 14 of the bicycle 10 and facilitate mounting of the wheel $20_i$ to the bicycle 10.

The wheel $20_i$ is made up of one or more materials. The non-pneumatic tire 34 comprises a tire material 45 that makes up at least a substantial part (i.e., a substantial part or an entirety) of the non-pneumatic tire 34. The hub 32 comprises a hub material 72 that makes up at least a substantial part of the hub 32. In some embodiments, the tire material 45 and the hub material 72 may be different materials. In other embodiments, the tire material 45 and the hub material 72 may be a common (i.e., the same) material.

In this embodiment, the tire material 45 constitutes at least part of the annular beam 36 and at least part of the spokes $42_1$-$42_T$. Also, in this embodiment, the tire material 45 constitutes at least part of the tread 50. More particularly, in this embodiment, the tire material 45 constitutes at least a majority (e.g., a majority or an entirety) of the annular beam 36, the tread 50, and the spokes $42_1$-$42_T$. In this example of implementation, the tire material 45 makes up an entirety of the non-pneumatic tire 34, including the annular beam 36, the spokes $42_1$-$42_T$, and the tread 50. The non-pneumatic tire 34 is thus monolithically made of the tire material 45. In this example, therefore, the annular beam 36 is free of (i.e., without) substantially inextensible reinforcement running in the circumferential direction of the wheel $20_i$ (e.g., a layer of metal, composite (e.g., carbon fibers, other fibers), and/or another material that is substantially inextensible running in the circumferential direction of the non-pneumatic tire 34). In that sense, the annular beam 36 may be said to be "unreinforced".

The tire material 45 is elastomeric. Any polymeric material with suitable elasticity may be used. For example, in this embodiment, the tire material 45 comprises a thermoplastic co-polymer elastomer.

The non-pneumatic tire 34 may comprise one or more additional materials in addition to the tire material 45 in other embodiments (e.g., different parts of the annular beam 36, different parts of the tread 50, and/or different parts of the spokes $42_1$-$42_T$ may be made of different materials). For example, in some embodiments, different parts of the annular beam 36, different parts of the tread 50, and/or different parts of the spokes $42_1$-$42_T$ may be made of different elastomers. As another example, in some embodiments, the annular beam 36 may comprise one or more substantially inextensible reinforcing layers running in the circumferential direction of the wheel $20_i$ (e.g., one or more layers of metal, composite (e.g., carbon fibers, other fibers), and/or another material that is substantially inextensible running in the circumferential direction of the wheel $20_i$).

The hub material 72 may be of any suitable kind, including metallic or polymeric. In this embodiment, the hub material 72 is significantly stiffer than the tire material 45. More particularly, in this embodiment, the hub material 72 is metallic (e.g., steel, aluminum, etc.).

The hub 32 may comprise one or more additional materials in addition to the hub material 72 in other embodiments (e.g., different parts of the hub 32 may be made of different materials).

The wheel $20_i$ may be manufactured in any suitable way. For example, in some embodiments, the tire 34 and/or the hub 32 may be manufactured via centrifugal casting, a.k.a. spin casting, which involves pouring one or more materials of the wheel $20_i$ into a mold that rotates about an axis. The material(s) is(are) distributed within the mold via a centrifugal force generated by the mold's rotation. In some cases, vertical spin casting, in which the mold's axis of rotation is generally horizontal, may be used. In other cases, horizontal spin casting, in which the mold's axis of rotation is generally vertical, may be used. As another example, in some embodiments, the tire 34 and/or the hub 32 may be manufactured via injection molding by injecting material into a mold. In this embodiment, the tire 34 is made by thermoplastic injection and the hub 32 is made separately so that the tire 34 and the hub 32 are assembled together subsequently.

The wheel $20_i$ may be manufactured using any other suitable manufacturing processes in other embodiments.

Stiffness characteristics of the wheel $20_i$, including its non-pneumatic tire 34, may be considered.

For example, a radial stiffness $K_z$ of the wheel $20_i$ refers to a rigidity of the wheel $20_i$ in the radial direction of the wheel $20_i$ (e.g., the vertical direction of the wheel $20_i$), i.e., a resistance of the wheel $20_i$ to deformation in the radial direction of the wheel $20_i$ when loaded in the radial direction of the wheel $20_i$. A lateral stiffness $K_y$ of the wheel $20_i$ refers to a rigidity of the wheel $20_i$ in the widthwise (i.e., axial) direction of the wheel $20_1$, i.e., a resistance of the wheel $20_i$ to deformation in the widthwise direction of the wheel $20_i$ when loaded in the widthwise direction of the wheel $20_i$.

Figure 3:
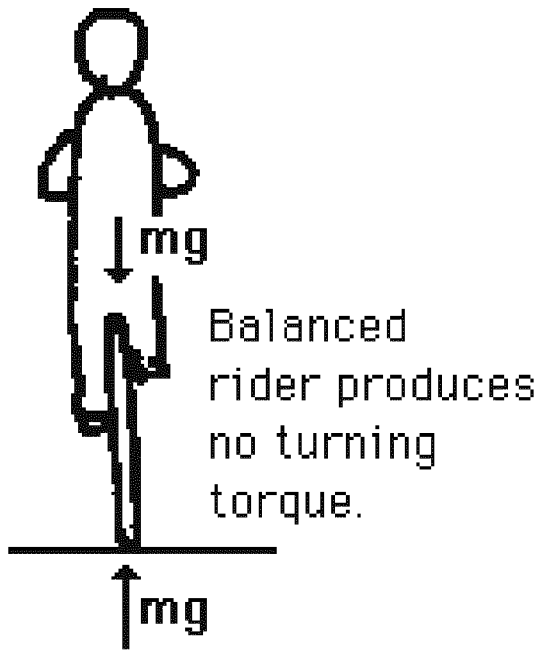
FIGS. 3 to 7 illustrate an example of dynamics of the vehicle in steady-state cornering and in non-steady-state operation.
Figure 4:
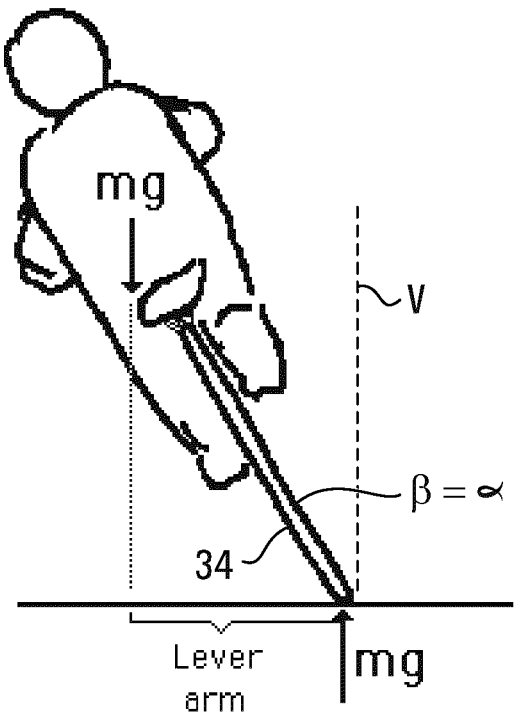
Figure 5:
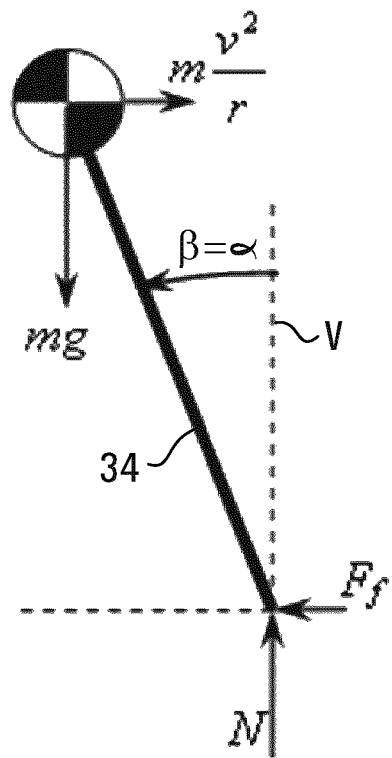

FIGS. 3 to 5 illustrates an example of dynamics of the bicycle 10 that may occur in steady-state cornering, without intent to be bound to any theory. To maintain equilibrium when negotiating a turn, the bicycle 10, which is a two-wheeled in-line vehicle, develops the lean angle α that corresponds to the camber angle β of the non-pneumatic tire 34. A lateral force is generated in the contact patch 25 of the non-pneumatic tire 34 due to this lean angle:

$$N=-mg \quad (1)$$

Where m=vehicle+rider mass g=acceleration of gravity $$F_f=N\tan(\beta) \quad (2)$$

Where β=camber angle $$F_f = m\frac{v^2}{r} \quad (3)$$

Where $F_f$ is friction force
v=vehicle velocity
r=radius of curvature of turn

Figure 6:
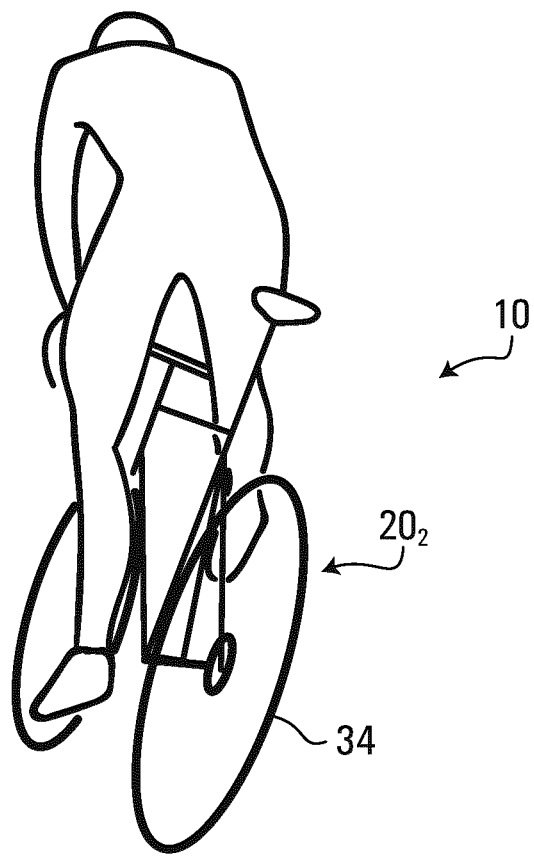
Figure 7:
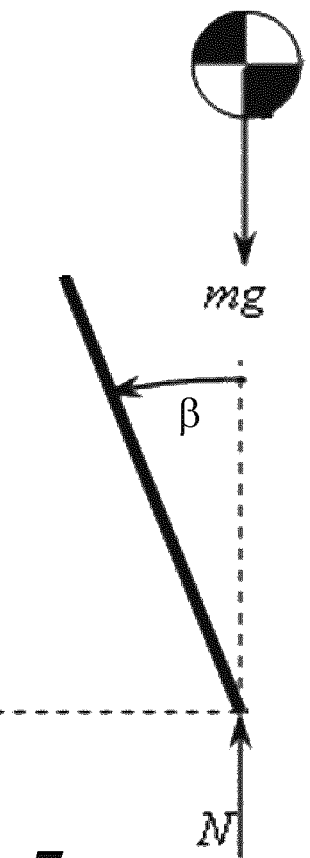

The tire 34 of the bicycle 10 may also be subjected to camber angles that are not related to steady-state cornering. For example, FIGS. 6 and 7 shows an example in which the cyclist who is standing on the pedals 15, rocking the bicycle 10 from side to side as he/she pedals. This motion may induce large camber angles without any net lateral acceleration. A center of mass of the rider is not aligned with the tire 34 and the bicycle 10. Rather, the rider's center of mass vertically aligns with a reaction force in the contact patch 25 of the tire 34, while the frame 12 of the bicycle 10 is inclined at the lean angle α that corresponds to the camber angle β.

The wheel $20_i$, including the non-pneumatic tire 34, can be designed to accommodate these types of loadings, which do not generally occur in 4-wheeled vehicles that are not camber-steered. As further discussed below, through mechanics of materials, modeling, and experimentation, the inventor has found problems that a tension-based non-pneumatic tire may have when used for a camber-steered vehicle like the bicycle 10, and has developed solutions for those problems that can be implemented in some embodiments of the wheel $20_i$, including its non-pneumatic tire 34.

Figure 8:
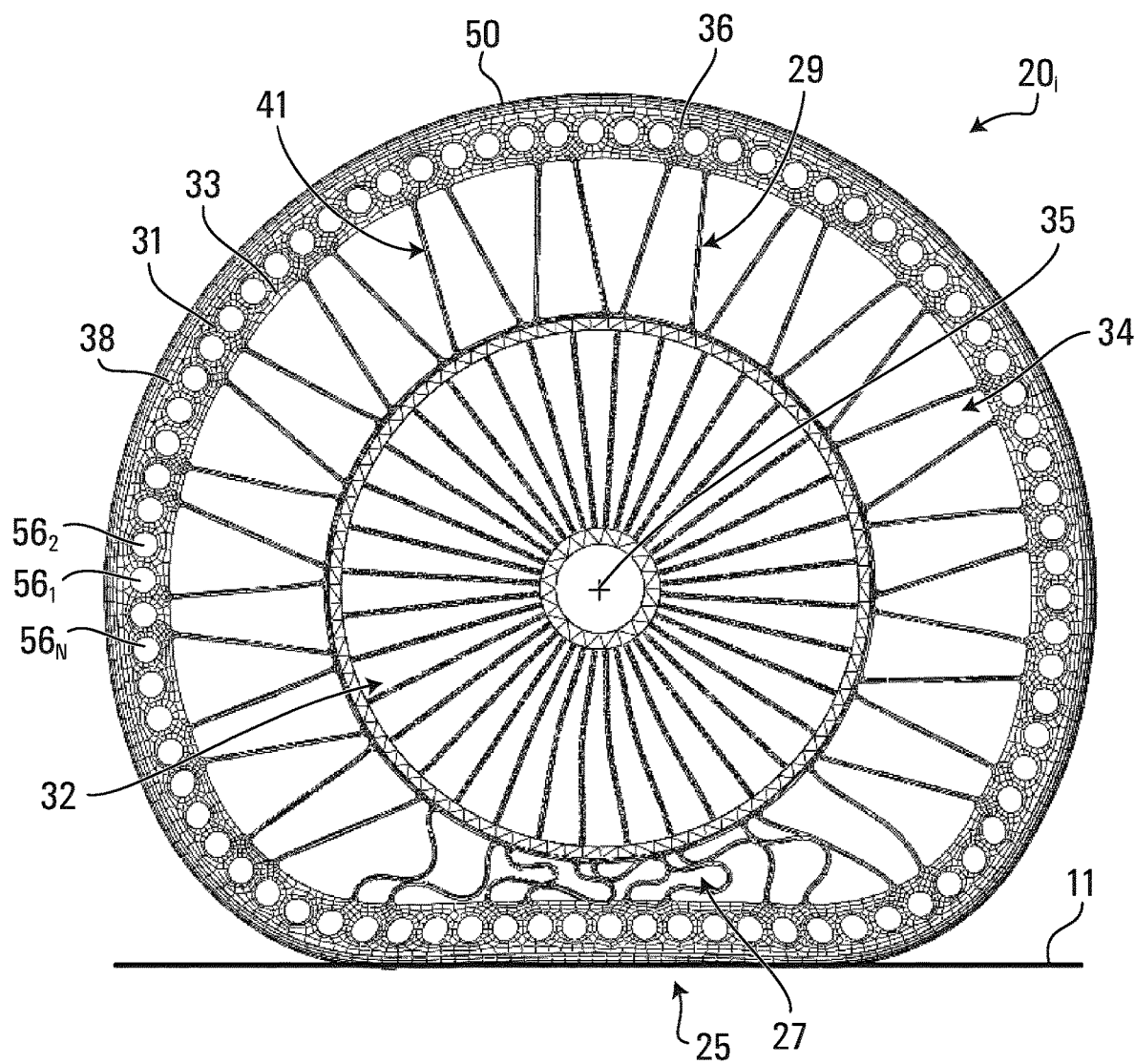
FIG. 8 shows an example of the wheel under large radial deflection.

The tire 34 may be capable of large deflection, as shown in FIG. 8. A maximum deflection of the tire 34 may be a significant percentage of a radius $R_T$ of the tire 34. In some embodiments, the maximum deflection of the tire 34 may be at least 15%, in some cases at least 25%, in some cases at least 35%, and in some cases an even greater proportion of the radius $R_T$ of the tire 34. This may provide a suspension function for the bicycle 10.

The width $W_T$ of the non-pneumatic tire may be small compared to the outer diameter $D_W$ of the tire 34. As discussed above, this may be particularly useful for camber steer vehicle mechanics, shown in FIGS. 4 to 7. For example, in some embodiments, a ratio of the width $W_T$ of the tire 34 to the outer diameter $D_T$ may be no more than 25%, in some cases no more than 15%, in some cases no more than 10%, in some cases no more than 7%, and in some cases even less.

Yet, in some embodiments, this geometry may be susceptible to instability in certain types of loading. FIGS. 9 and 10 shows results of finite element analysis (FEA) for two designs of non-pneumatic tires like the non-pneumatic tire 34. Both designs have an outer diameter of 660 mm. Design A has a width of 45 mm, and Design B has a width of 60 mm. When loaded against a flat surface with no camber angle, Design A exhibits a buckling type of behavior. The annular beam 36 deforms in torsion (twisting) in the R-Y plane and deflects in the axial direction. Conversely, Design B remains stable.

FIG. 11 shows predicted load vs. deflection for these two models. Design B (60 mm) continues to develop load, in a rather linear fashion, to the extent of the imposed deflection of 75 mm. At 75 mm, the force is 7000 N for Design B. Conversely, Design A reaches a maximum load of 4000 N at a deflection of 61 mm. Then, a bifurcation response occurs, and the load drops precipitously. In actual use on a vehicle, this type of tire response could cause problems in vehicle operation.

FIGS. 12 and 13 show FEA predicted deformed geometry of Designs A and B, when loaded on a flat surface at a camber angle of 10 degrees, to an imposed radial deflection of 20 mm. The annular beam 36 of the non-pneumatic tire 34 of Design A twists much more than that of Design B, with a commensurately greater axial deflection. As with the instability noted earlier, axial tire deflection induced by camber loading may result in control problems for a camber steer vehicle such as the bicycle 10.

Mechanics behind these responses are to be understood and mastered in the design process for non-pneumatic tires used in camber steer applications such as the non-pneumatic tire 34 of the bicycle 10.

The field of mechanics of materials encompasses torsional rigidity of shafts. For example, *Mechanics of Materials*, $4^{th}$ Edition, by R. C. Hibber, 1999, Chapter 5, pp 177-244, is devoted to torsion. A straight shaft subjected to a torque develops an angle of twist according to the following equation:

$$\phi = \frac{TL}{JG} \quad (4)$$

Figure 14:
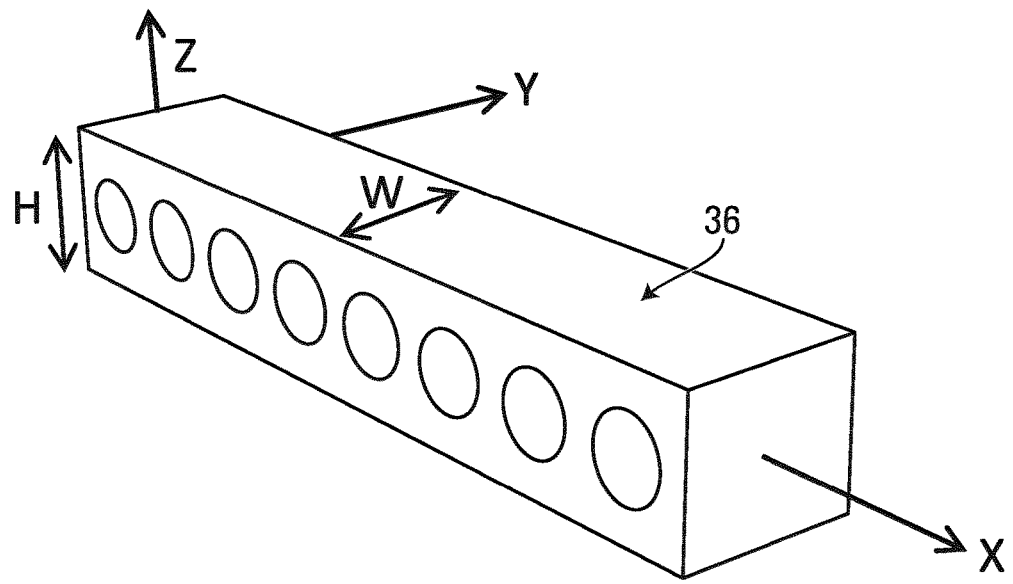
FIGS. 14 and 15 show an example of geometry used for finite element analysis (FEA) of torsional rigidity of an annular beam of the non-pneumatic tire.
Figure 15:
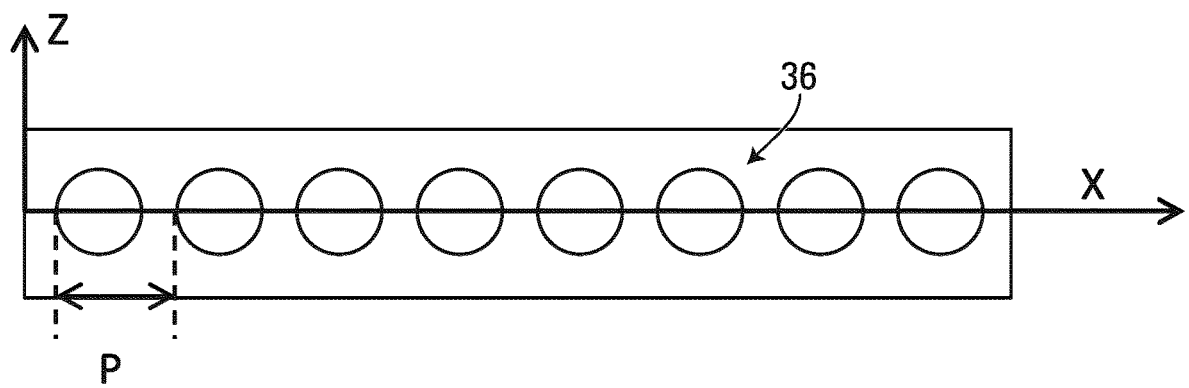

Where: φ=twist angle in radians
T=applied torque
L=shaft length
J=shaft polar moment of inertia
G=shaft shear modulus In this embodiment, the annular beam 36 of the non-pneumatic tire 34 can be viewed as functioning like a shaft to resist torsional deflections in the R-Y plane at and near the contact patch 25 of the tire 34 with the ground surface 11, like that seen in FIGS. 14 and 15.

In Equation 4, the applied torque is a system input, dictated by the vehicle load. Effective shaft length relates to the circumference of the annular beam 36. This is also dictated by the tire size for the vehicle. Thus, to reduce the twist angle β, JG, which is generally referred to as a torsional rigidity of the shaft, can be increased.

Accordingly, a torsional rigidity JG of the annular beam 36 of the non-pneumatic tire 34 at its contact patch 25 with the ground surface 11 can be considered. Notably, the torsional rigidity of the annular beam 36 may be sufficient to achieve the camber angle β of the non-pneumatic tire 34 when the bicycle 10 is leaned.

The polar moment of inertia J can be precisely calculated for shafts of simple geometry—with a solid rectangular or circular cross section. For such beams, the shear modulus G is simply the shear modulus of the material. However, in some embodiments, for the annular beam 36 of the non-pneumatic tire 34, the cross-section may not be homogeneous or simple. Webbing designs that traverse the width of the annular beam 36 in the axial direction may be present. As such, numerical procedures such as FEA can be used to calculate the torsional rigidity JG of the annular beam 36 of the tire 34.

Towards this goal, the inventor has approximated the annular beam 36 of the tire 34 as a straight shaft, shown in FIGS. 16 and 17. The X direction approximates the 0 direction of the annular beam 36 of the tire 34 at the contact patch 25. This straight shaft has the complex geometry of the annular beam 36, including the webbing defined by the voids $56_1$-$56_N$ implemented as equally-spaced circular cutouts. A view of the YZ plane is shown in FIG. 17.

The shaft is constrained on one end, and a torque is applied to the other end, as shown in FIG. 16. The results of an FEA are shown in FIG. 17. The resultant nodal displacements are shown. The shaft twists around the centroid of the cross-section. By predicting the angle of twist, and knowing the length L of the shaft, JG is calculated by rearranging Equation 4:

$$JG = \frac{TL}{\phi} \quad (4)$$

Figure 18:
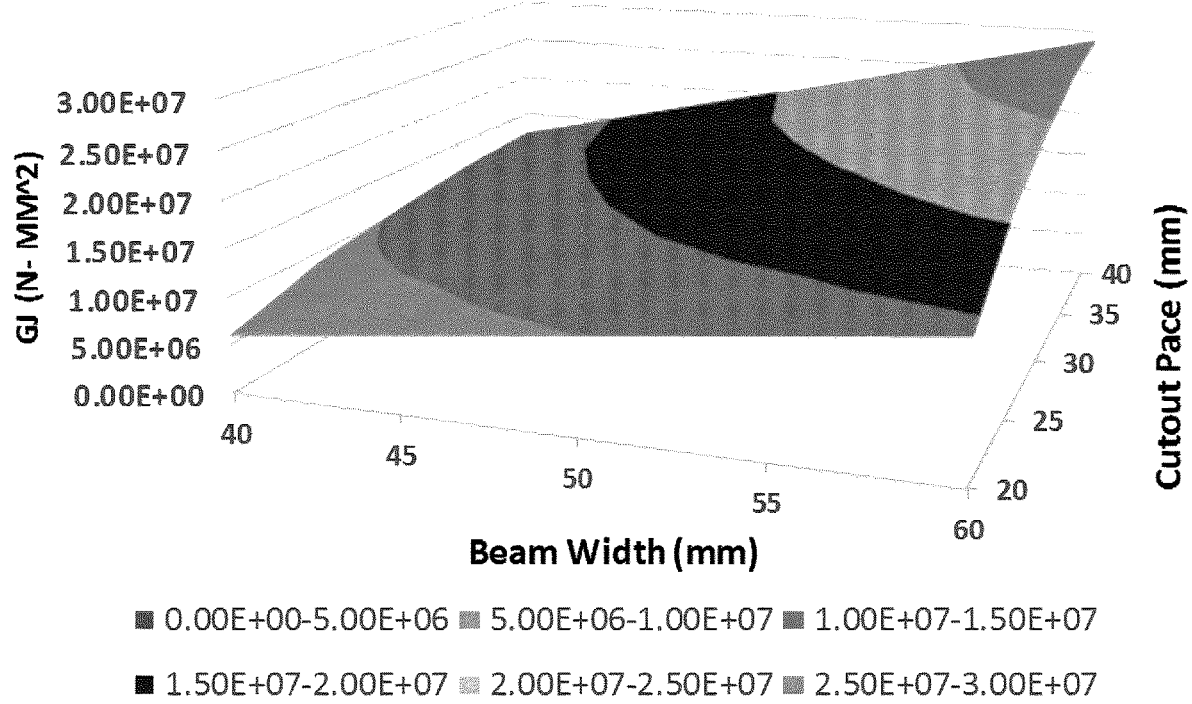
FIG. 18 shows an example of FEA results of the torsional rigidity.

The inventor designed a parameterized study to relate JG to design variables for the annular beam 36 of the non-pneumatic tire 34. In this example, the tire material 45 has a Young's modulus E=200 MPA, with Poisson's ratio=0.40. Results are shown in FIG. 18. The torsional rigidity JG of the annular beam 36 is plotted with respect to a width of the annular beam, which in this example corresponds to the width $W_T$ of the tire 34, and to a spacing $C_V$, or "pace", of the cutouts $56_1$-$56_N$. For a width $W_T$=40 mm, and a cutout pace $C_V$ of 20 mm, JG=5.1e6 MPA*mm$^4$. For a cutout pace $C_V$=40 mm and a width $W_T$=60 mm, JG=2.9e7 MPA*mm$^4$.

The inventor then used similar design values in construction of physical and numerical prototypes. To resist twisting and buckling under high vertical loads and/or loading with camber angles, a JG value of at least 1.5e7 MPa*mm$^4$ was used for the annular beam 36 of the non-pneumatic tire 34 with a design load of 1000 N (100 kg).

Further study showed that the torsional rigidity JG of the annular beam 36 of the non-pneumatic tire 34 may directly relate to the design load of the tire 34, which can be denoted $F_{zd}$. Therefore, in some embodiments, the torsional rigidity JG of the annular beam 36 of the non-pneumatic tire 34 may be expressed as a ratio to the design load $F_{zd}$ such that JG/$F_{zd}$ may be at least 1.16e7 (N/mm$^2$*mm$^4$)/1000 N=1.16E4 mm$^2$, in some cases at least 2.0e4 mm$^2$, in some cases at least 3e4 mm$^2$, and in some cases even more.

Adequate values of the torsional rigidity JG of the annular beam 36 of the non-pneumatic tire 34 may be attained using design variables other than cutout pace and beam width. For example, in some embodiments, a thickness of the annular beam 36 of the tire 34 in the radial direction may be increased; a geometry of the voids $56_1$-$56_N$ may be changed from circles to triangles or to any other suitable shape; and/or a material modulus of the annular beam 36 may be increased. Any such design variations that increase the torsional rigidity JG of the annular beam 36 of the non-pneumatic tire 34 for camber-steer vehicle operation are encompassed in various embodiments.

Figure 19:
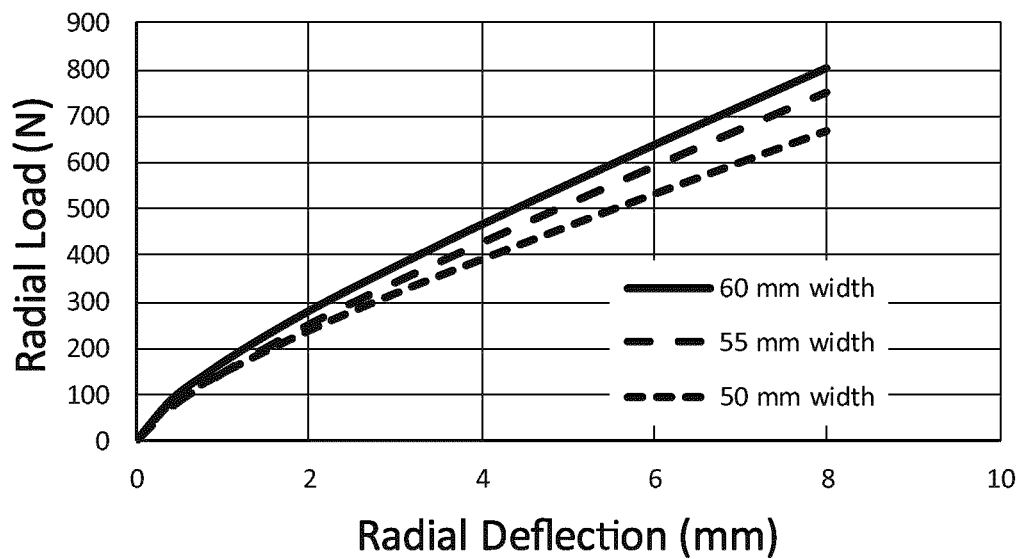
FIGS. 19 and 20 show an example of FEA results for load vs. deflection of different designs of the non-pneumatic tire.
Figure 20:
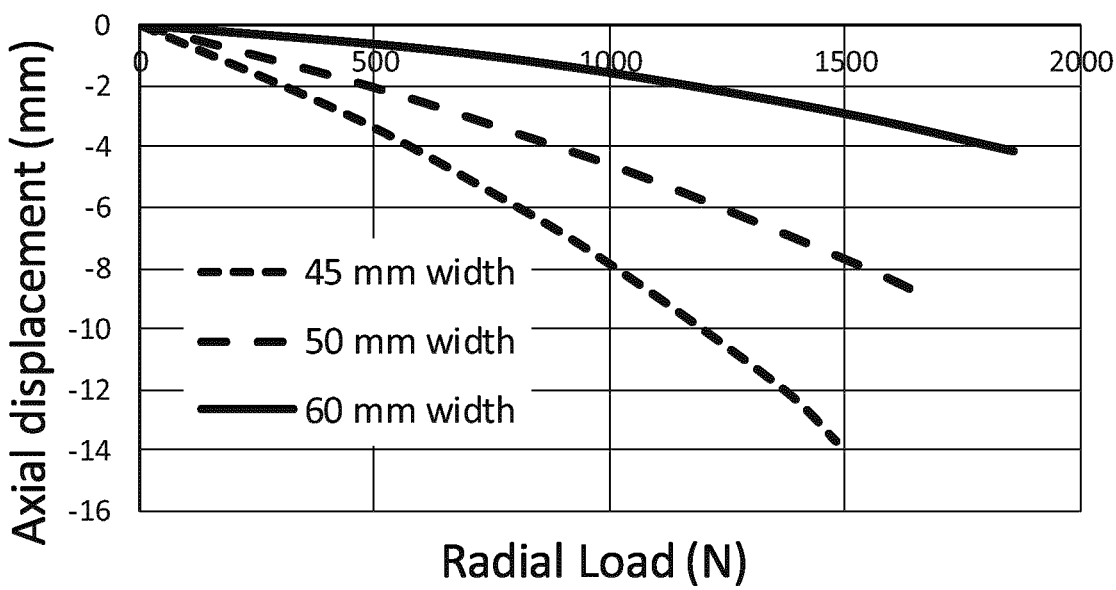

FEA predictions for load vs deflection are shown in FIGS. 19 and $20_i$ for 3 different widths of the annular beam 36 of the non-pneumatic tire 34. Lateral deflection when loaded against a surface cambered at 10 degrees is also shown.

Increasing the width $W_T$ did result in increasing the vertical stiffness of the tire 34; however, increasing the width $W_T$ made a larger difference in reducing lateral displacement when loaded with a 10 degree camber angle. This surprising result was another indication of the effectiveness of the torsional rigidity in improving stability.

Figure 21:
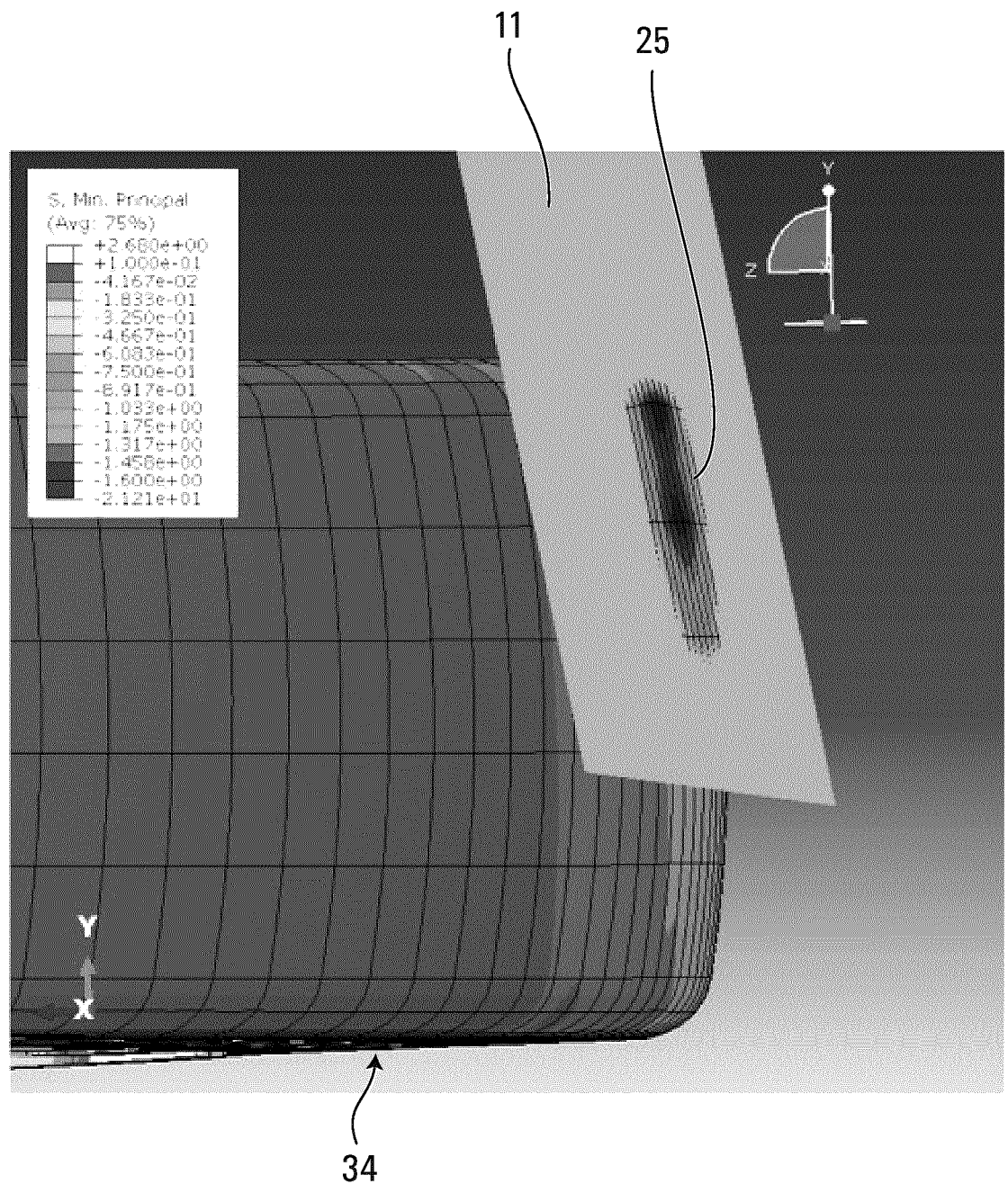
FIGS. 21 and 22 show an example of FEA results for a contact patch of different designs of the non-pneumatic tire.
Figure 22:
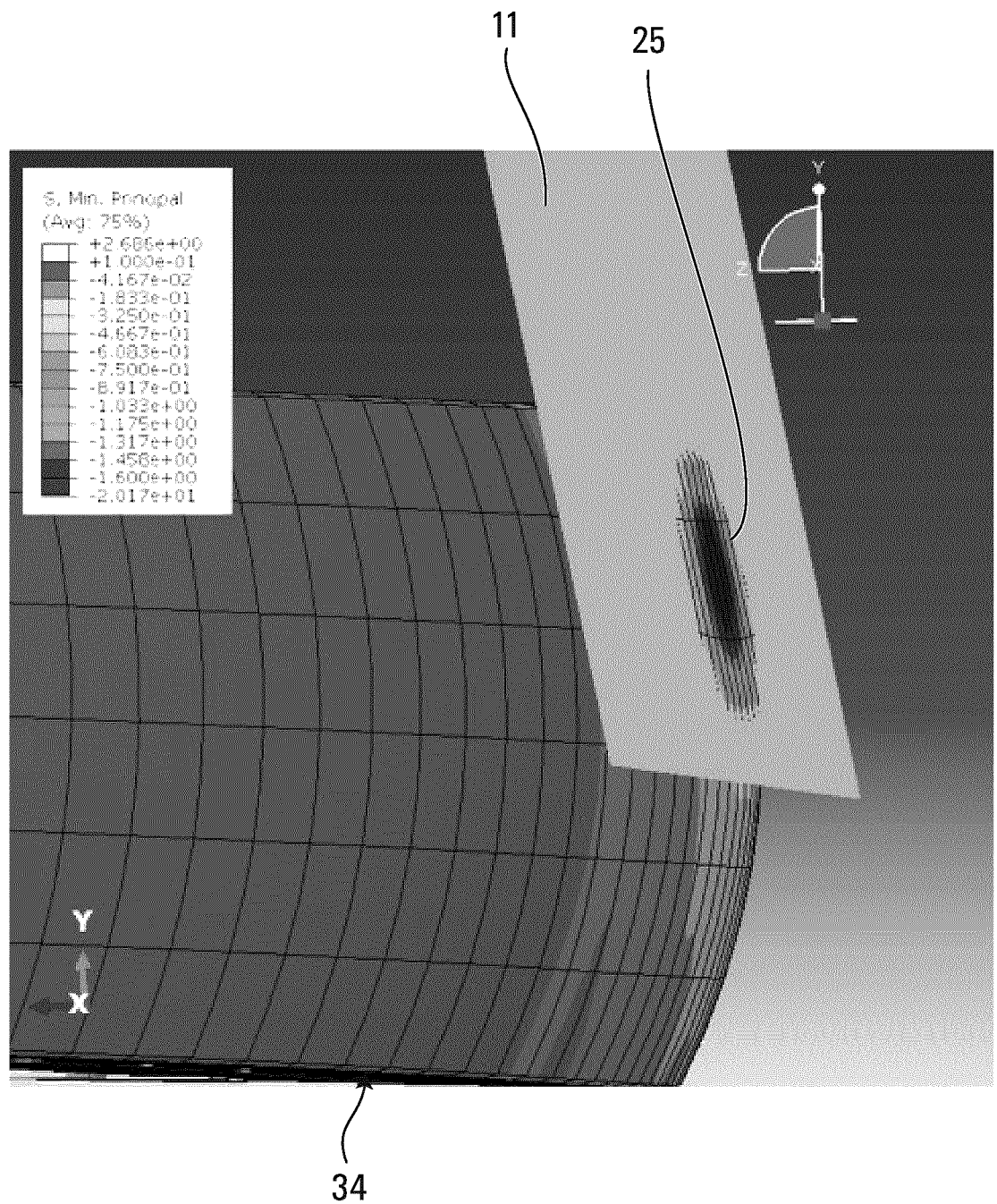
Figure 23:
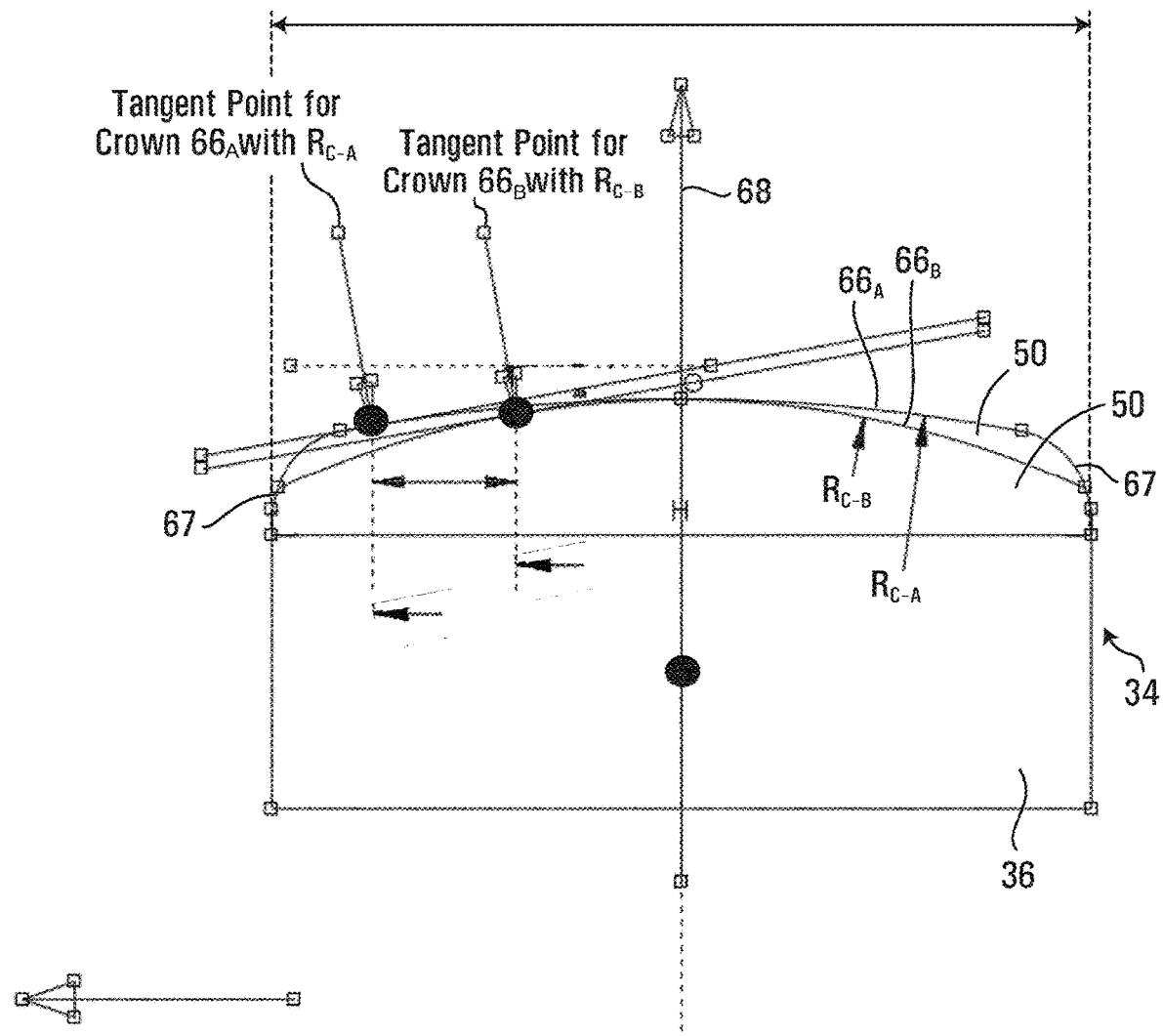
FIG. 23 shows an example of two versions of a cross-section of a tread of the non-pneumatic tire, and 10-degree tangent points.

FIGS. 21 to 23 show two non-pneumatic tires such as the non-pneumatic tire 34 loaded with a 10-degree camber angle onto a flat surface, in which Versions A and B differ in a crown radius of a crown of the tire in the widthwise direction of the tire, but are otherwise identical. The minimum principle (compressive) stress is shown in the contact patch 25 of each tire. The crown radius $R_{C-A}$ of the crown $66_A$ of Version A is larger than the crown radius $R_{C-A}$ of the crown $66_B$ of Version B.

The contact patch 25 of Version A is closer to a shoulder 67 of the tire and farther away from a centerline 68 of the tread 50 of the tire in its widthwise direction, compared to Version B. The location of the contact patch 25 coincides closely with a tangent point a 10-degree line makes with the crown profile. This is shown in FIG. 23. The tangent point for the crown $66_A$ of Version A is 12 mm further from the centerline 68 than the tangent point for crown $66_B$ of Version B.

Figure 24:
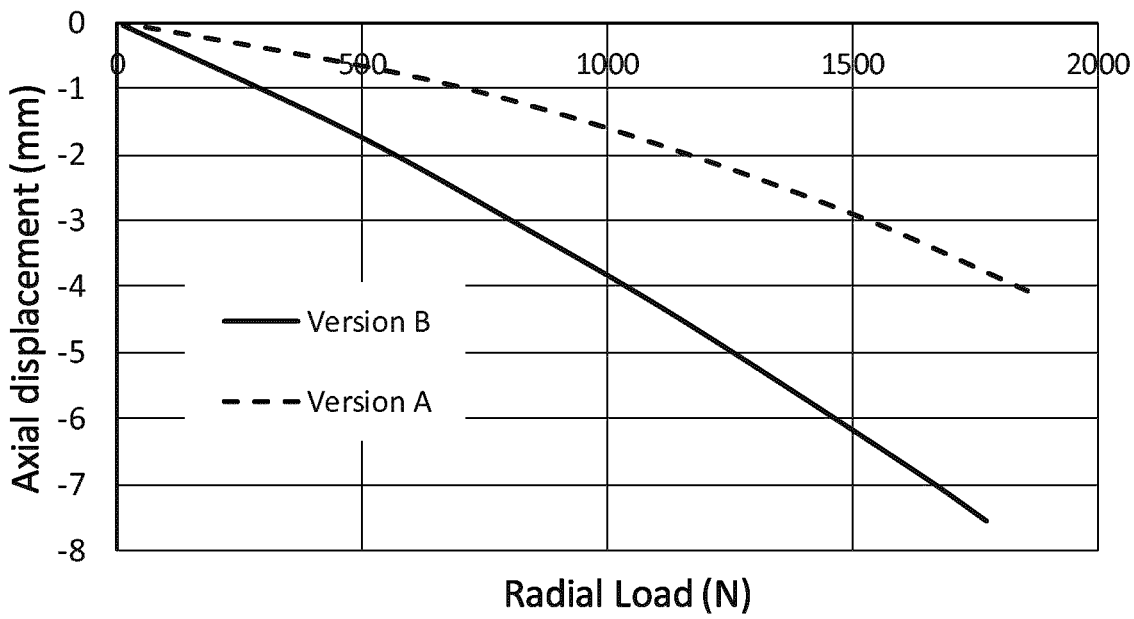
FIG. 24 shows an example of FEA results for contact pressure at a design load of the non-pneumatic tire.

FEA results for lateral displacement vs vertical force, when loaded at a camber angle of 10 degrees, is shown in FIG. 24. The results are surprising, as the crown profile of the non-pneumatic tire 34 was found to have as much influence as doubling the torsional rigidity JG of the annular beam 36 of the tire 34. Close study of FIG. 23 reveals a reason behind this sensitivity. When the contact force resultant occurs at the tangent point on version A, a counter-clockwise torque results around a centroid of the annular beam 36 of the tire 34. This torque is greater than the torque recreated with Version B, as the contact force resultant is farther away from the centerline 68. This torque tends to twist the annular beam 36 of the tire 34 in a restorative sense, opposite the deflection which naturally results from loading on a cambered surface.

Experimentation and prototyping by the inventor have shown that this effect may be used to great advantage. For example, in some embodiments, a tread profile of the tread 50 in the widthwise direction of the non-pneumatic tire 34 may be configured such that a tangent point of the tread 50 with a 10-degree cambered contact surface (i.e., when the camber angle β is 10 degrees) is at a distance of at least 25% of a width $W_{tr}$ of the tread 50 from the centerline 68 of the tread 50, in some cases of at least 30% of the width $W_{tr}$ of the tread 50 from the centerline 68 of the tread 50, in some cases of at least 35% of the width $W_{tr}$ of the tread 50 from the centerline 68 of the tread 50, in some cases of at least 40% of the width $W_{tr}$ of the tread 50 from the centerline 68 of the tread 50, and in some cases of even more of the width $W_{tr}$ of the tread 50 from the centerline 68 of the tread 50.

A rolling resistance of the non-pneumatic tire 34 that is low may be a great virtue for the bicycle 10 (e.g., to be more efficient when pedaling, and as it is an electric vehicle whose range between battery charges may be improved by tires having low rolling resistance). Camber steer NPTs may not have the same geometry or operate at the same loads and speeds as NPTs for other, non-cambered vehicles where low rolling resistance may also be desirable. In some embodiments, thermoplastic copolymers, such as Hytrel, manufactured by DuPont, and Keyflex, manufactured by LG, are two examples of thermoplastic copolymers that can be used in injection molding of the non-pneumatic tire 34 and allow its rolling resistance to be low. For instance, these elastomers may have an extension modulus between 130 MPa to 240 MPa, and may have a hysteresis loss coefficient (tan(delta)) of between 0.03 to 0.09, when tested at a tensile elongation of 2%, a frequency of 10 HZ, and a temperature of 40° C.

In some embodiments, a coefficient of rolling resistance of the non-pneumatic tire 34 may be no more than 0.010, in some cases no more than 0.008, in some cases no more than 0.06, in some cases no more than 0.004, and in some cases even less. For instance, in some embodiments, when designed to give a ratio of vertical stiffness to design load of 0.12 N/mm/N, and a torsional rigidity JG of 2.0E7 N.mm², the coefficient of rolling resistance of the non-pneumatic tire 34 may be as mentioned above, and in some cases no more than 0.010. Rolling resistance, including the coefficient of rolling resistance of the non-pneumatic tire 34, may be measured using SAE J1269.

The non-pneumatic tire 34 may be designed according to principles disclosed in International Application PCT/CA2018/050534, which is owned by the applicant and incorporated by reference herein, including to provide greater crack propagation resistance to the non-pneumatic tire 34 when subject to tensile stress.

The non-pneumatic tire 34 may be designed according to principles disclosed in International Application (87960-25 gate patent), which is owned by the applicant and incorporated by reference herein, including to provide a thermoplastic injection process that enhances tire performance by reducing the impact of weld lines that are formed in the injection process.

For efficient torque transfer from the powertrain 14 of the bicycle 10 (i.e., from the pedals 15 and/or the power source 13 and the transmission 19) to the contact patch 25 of the non-pneumatic tire 34, the wheel $20_i$ can have a torsional rigidity Kθ about its axial direction (i.e., Y direction) that is large. In this embodiment, the spokes $42_1$-$42_T$ of the tire 34 may have alternate inclination angles in the R-θ plane, as shown, such that adjacent ones of the spokes $42_1$-$42_T$ diverge or converge from the annular beam 36 towards the hub 32. This may make the torsional rigidity Kθ of the wheel $20_i$ around the Y axis large. For example, in some embodiments, the torsional rigidity Kθ of the wheel $20_i$ about its axis of rotation may be at least 1.5E6 N-mm/radian. Testing shows this value may be high enough to assure stable operation in braking and acceleration. In some embodiments, especially for larger and/or heavier camber steer vehicles, the torsional rigidity Kθ of the wheel $20_i$ about its axis of rotation may be at least 3E6 N-mm/radian, in some cases at least 6E5 N-mm/radian, in some cases at least 9E6 N-mm/radian, and in some cases even higher.

The wheel $20_1$, including the non-pneumatic tire 34 and/or the hub 32, may be implemented such that the tire is demountable from the wheel. As shown in Figure XX, the tire may comprise a dovetail-shaped geometry on the inner radial extent. This may facilitate firmly mounting the tire to the rim. The rim may include a detachable flange. Both the detachable flange and the axially opposing flange may be dovetail shaped as well, corresponding to the dovetail shape of the base of the tire. With such a geometry, the tire is held in place when the detachable flange is affixed to the rim.

Any other suitable method of tire attachment to the rim may be used. For example, the dovetail shape may be combined with other fixation devices—screws, pins and the like—which further serve to firmly fix the time onto the rim.

The wheel $20_i$, including the non-pneumatic tire 34 and/or the hub 32, may be implemented in various other ways in other embodiments.

Figure 26:
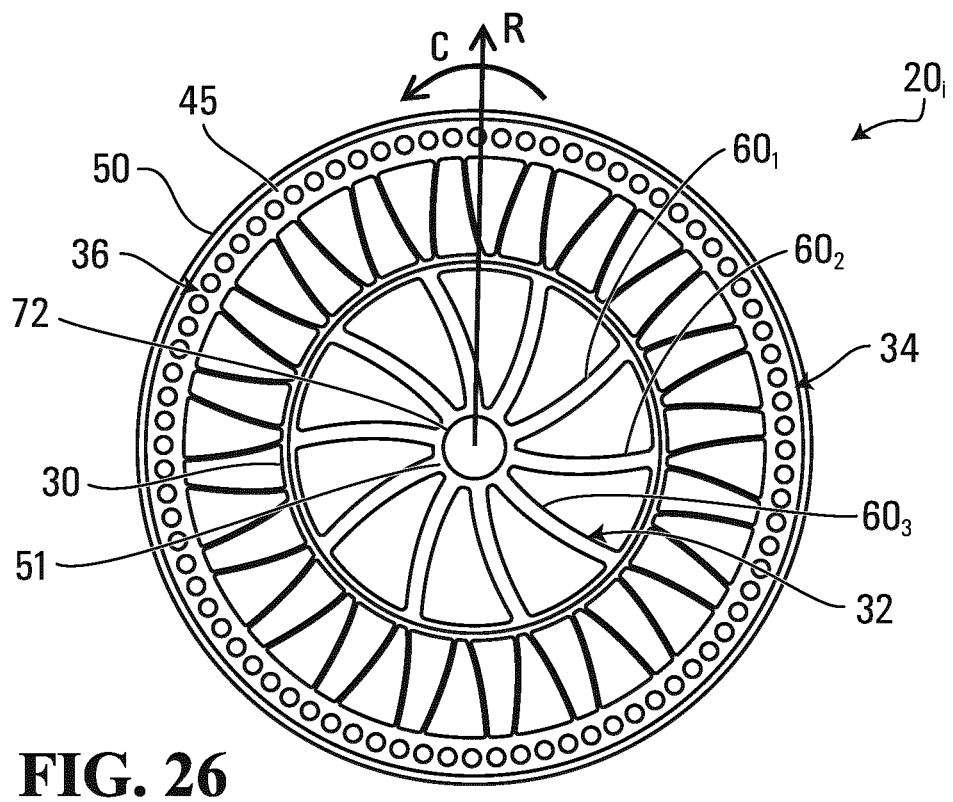
FIGS. 26 and 27 show an example of another embodiment of the wheel.
Figure 27:
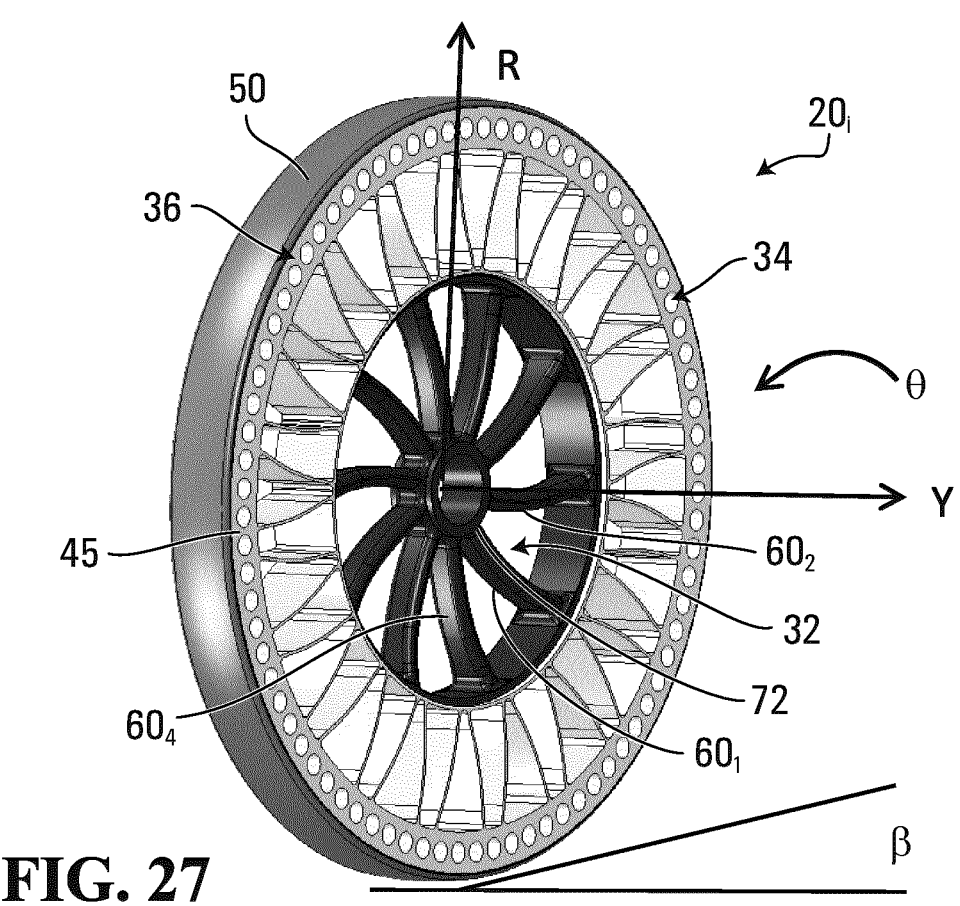

For example, in other embodiments, the hub 32 may be implemented in any other suitable way and/or formed integrally with the non-pneumatic tire 34. For instance, in some embodiments, as shown in FIGS. 26 and 27, each of the spokes $60_1$-$60_A$ of the hub 32 does not project rectilinearly between the inner hub member 51 and the rim 30, but rather is curved such that it deviates from a rectilinear path along the radial direction of the wheel $20_i$. The hub material 72 may be polymeric.

In some embodiments, to achieve low weight, high rigidity, and low rolling resistance, the tire material 45 and/or the hub material 72 may be implemented in any other suitable way. For example, in some embodiments, the tire material 45 may be at least mostly non-elastomeric (i.e., mostly or entirely non-elastomeric).

For instance, the inventor has found materials other than thermoplastic elastomers that may function well as the tire material 45. In some embodiments, the tire material 45 may include polyamide (nylon) material. Unreinforced nylon (PA) grades, such as PA6 or PA66, may offer advantages. These materials may have an extension modulus of between 1500-2500 MPa. Further, nylon alloys may be designed, comprising impact modifiers and/or amorphous nylon. Specifically, the inventor has found that PA6 may be combined with a small percentage of EPDM (ethylene propylene diene terpolymer) rubber. A binary alloy of 92% PA6 and 8% EPDM rubber was shown to greatly improve crack propagation resistance, compared to 100% PA6, while maintaining a high modulus of 1300 MPa, even after water submersion at 23° C. for 96 hours.

Crack propagation and modulus retention may further be enhanced by adding a small percentage of amorphous nylon, creating a tertiary alloy. With a 90%/6%/4% blend, crack propagation may be at least equivalent to the binary alloy above, while maintaining a modulus of 1500 MPa after water submersion at 23° C. for 96 hours. This material also maintained a modulus of over 1000 MPa at 40° C., even after the above water submersion.

The exact percentages of constituents may vary. For example, with a binary alloy of PA6 or PA66 and an impact modifier such as EPDM rubber, the percentage of EPDM rubber may be at least 4%, 8%, 12%, or, in some cases, even higher.

With a tertiary alloy comprising PA6 or PA66 and EPDM rubber and amorphous nylon, the percentage of EPDM rubber may be at least 4%, 8%, or in some cases even higher; and the percentage of amorphous nylon may be at least 2%, 4%, or in some cases even higher.

In some embodiments, for all cases, the percentage of the base nylon PA6 or PA66 may be 84%, 88%, 92%, or, in some cases even higher.

Other materials that may be used for the tire material 45 in other embodiments include polybutylene terephthalate (PBT) and polypropylene.

Figure 28:
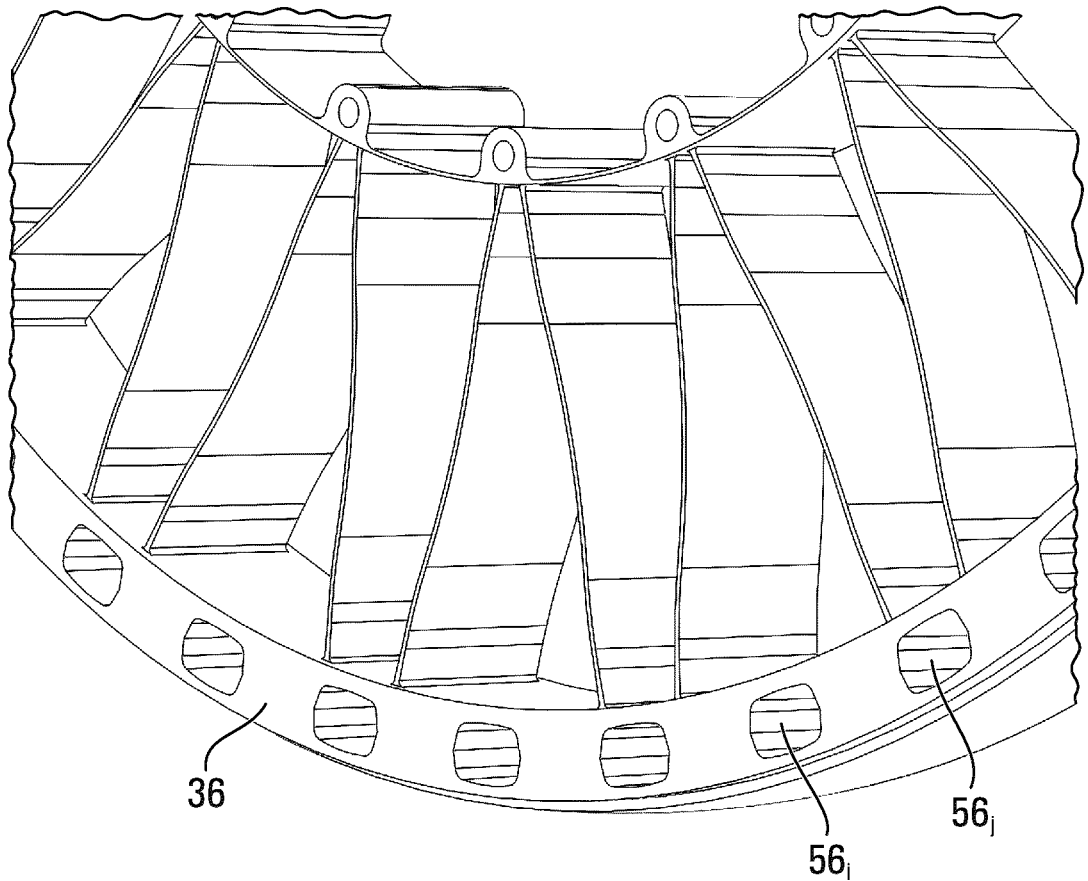
FIGS. 28 to 31 show examples of other embodiments of the wheel.
Figure 29:
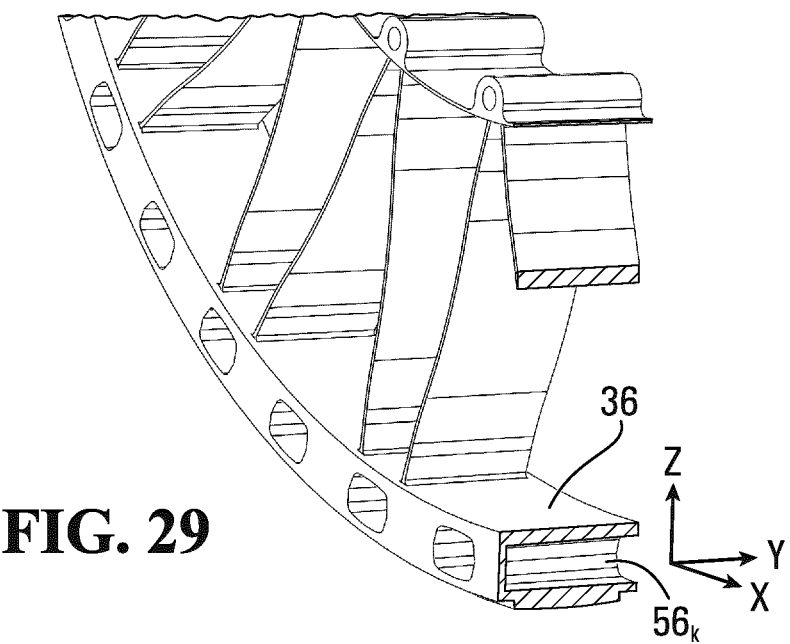
Figure 30:
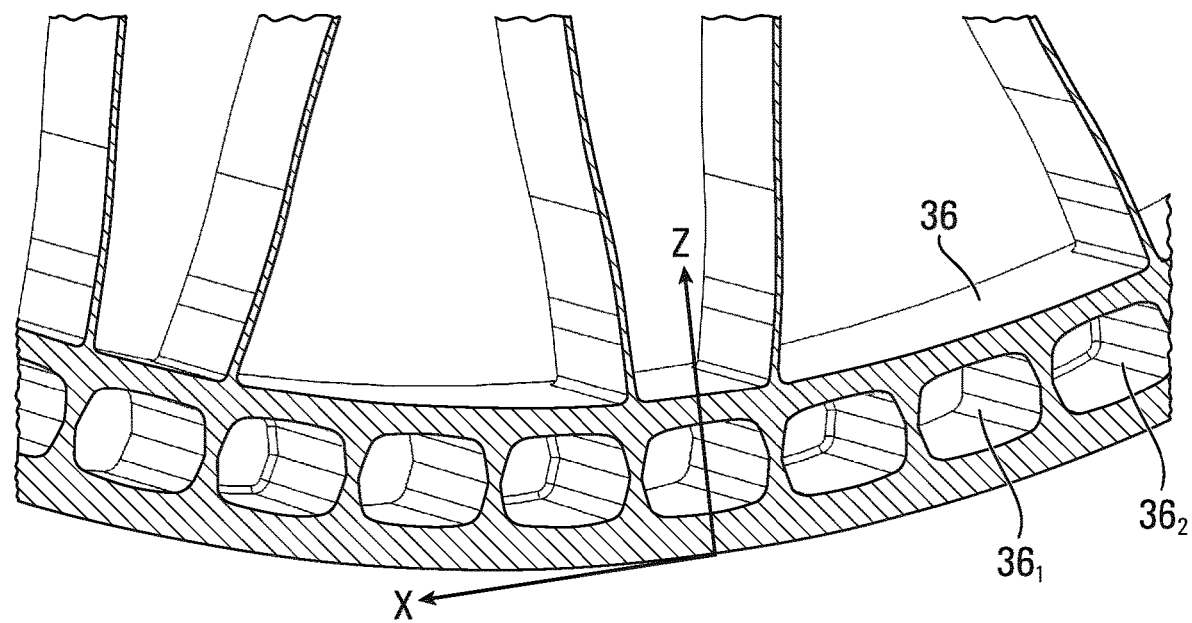

With reference to FIGS. 28 to 30, the inventor has discovered an alternative approach to increasing torsional rigidity of the annular beam 36 in some embodiments. FIG. 28 shows an embodiment in which the annular beam 36 appears to have a large space between the voids $56_1$-$56_N$, which are lateral cutouts. However, as shown in FIG. 29, there are exactly twice as many cutouts as would appear from FIG. 28, since each cutout does not extend all the way through the lateral extents of the annular beam.

Rather, each is a blind cutout, alternating from one side to the other. This structure results in a beam that has a higher torsional rigidity, due to the presence of the alternating outer wall created by each blind cutout. This outer wall is a maximum distance from the beam centroid, thereby improving the efficiency of the structure in shear rigidity.

One virtue of this design is that torsional rigidity is increased at constant width. Vehicle manufactures may have packaging constraints that limit tire width; therefore, being able to maximize torsional rigidity within certain geometric constraints is a positive attribute.

This structure is also easy to produce using thermoplastic injection, as the walls may be designed to be approximately equal in thickness with other beam design elements.

Figure 31:
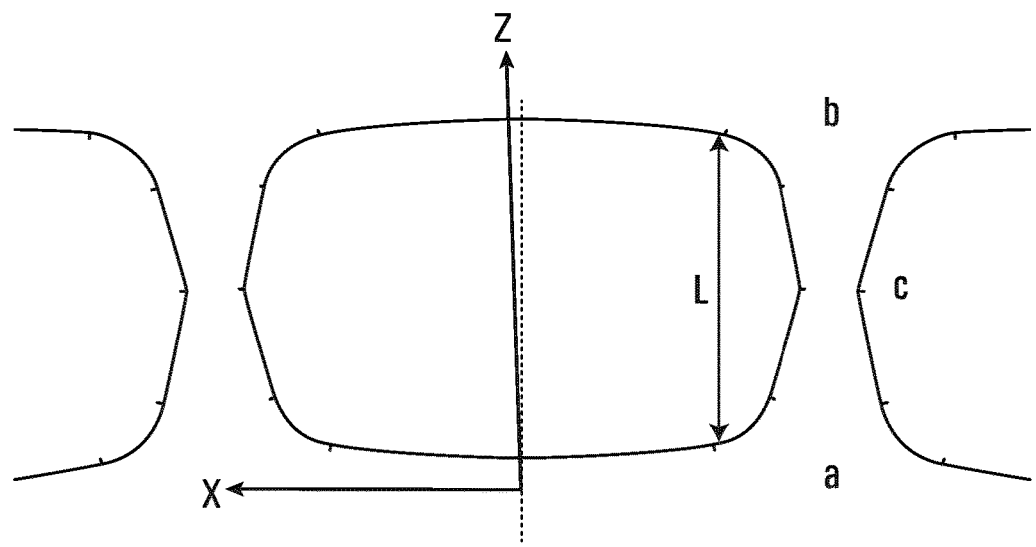

Turning now to FIG. 31, the inventor has discovered a geometry by which to reduce stresses in the webbing created by the openings $56_1$-$56_N$ (e.g., cutouts) in the annular beam 36 in some embodiments. The figure shows an XZ section of the webbing. A tapered beam geometry is disclosed, comprising:

end (a)
end (b)
midpoint (c)
span L

The tapered beam is thinnest at midpoint (c). As such, the bending stresses created when the tire is loaded are homogenized. This is due to the mechanics of the flexure equation:

$$\sigma = \frac{Mc}{I}$$

Where: σ=bending stress
M=bending moment
I=moment of inertia
c=distance from neutral axis Moment of inertia increases with the cube of the beam thickness; moment due to a shear force increases linearly with the distance along the beam axis from the force; the maximum distance (and hence the location of the maximum stress) increases linearly with the beam thickness.

From the above, it can be shown that a linearly tapered beam may minimize the maximum bending stress, while being designed for a certain bending stiffness. The maximum bending stress may be essentially constant along the beam axis.

The amount of taper and the thickness at the beam midpoint may be designed according to any of several criteria. This can include a minimum thickness value for ease of processing and mold filling, a desired stiffness, and/or maximum allowable change in wall thickness.

In some embodiments, the inventor has found that the thickness at bases (a) and (b) may be at least 33% higher than the thickness at midpoint (c); in other cases, 50%, and in other cases, 100%, and in other cases, even higher.

Further, the thickness at base (a) may be different from the thickness at base (b). As shown in the figure, base (a) is on the radially inner side of the cutout. The thickness at base (a) may be 5% to 15% thinner than that at base (b). In this case, the thickness at midpoint (c) may be defined relative to the average of the thicknesses at bases (a) and (b).

In some embodiments, the beam designs disclosed in FIGS. 28 to 31 may be designed using the nylon alloys and other materials earlier disclosed. The inventor has found that a complete non-pneumatic assembly comprising these design attributes may be designed that weigh a total of 10 pounds. This includes tread, thermoplastic core, and central spoked mounting rim and hub. This NPT may be designed to replace a pneumatic tire that is 26" outer diameter×2" wide.

While in embodiments the vehicle 10 is a bicycle, a wheel constructed according to principles discussed herein in respect of the wheels $20_1$, $20_2$ may be used as part of other vehicles or other devices in other embodiments.

For example, in some embodiments, the vehicle 10 may be a moped, a motocross, or another motorcycle in which the powertrain 14 comprises the power source 13 to fully power the vehicle 10 or partially power the vehicle 10 in combination with human-powering from pedaling.

As another example, in some embodiments, the powertrain 14 of the vehicle 10 may not comprise any power source like the power source 13. For instance, in some embodiments, the vehicle 10 may be a bicycle that is movable exclusively by human-pedaling.

In some embodiments, the vehicle 10 may be steerable other than by leaning the vehicle 10 (e.g., by pivoting front wheels of the vehicle 10 about steering axes to turn the vehicle 10). For example, in some embodiments, a wheel constructed according to principles discussed herein in respect of the wheel $20_i$ may be used as part of an agricultural vehicle (e.g., a tractor, a harvester, etc.), a forestry vehicle, a material-handling vehicle, or a military vehicle.

As another example, in some embodiments, the vehicle 10 may be a lawnmower (e.g., a riding lawnmower or a walk-behind lawnmower), a construction vehicle (e.g., a compact loader, a mining vehicle, etc.), an agricultural vehicle (e.g., a tractor, a harvester, etc.), a material-handling vehicle (e.g., a forklift), or any other type of vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but is not limiting. Various modifications and enhancements will become apparent to those of ordinary skill in the art.

The invention claimed is:

1. A non-pneumatic tire for a vehicle on a ground surface, the vehicle being movable by leaning to create a camber angle of the non-pneumatic tire, the non pneumatic tire comprising:
    an annular beam configured to deflect at a contact patch of the non-pneumatic tire with the ground surface;
    an annular support disposed radially inwardly of the annular beam and configured to resiliently deform as the non-pneumatic tire engages the ground surface; and
    a tread disposed radially outwardly of the annular beam, a profile of the tread in a widthwise direction of the non-pneumatic tire being configured such that, when the ground surface is substantially flat and the camber angle of the non pneumatic tire is 10 degrees, and a design load of the non pneumatic tire is no more than 150 $kg_f$, a tangent point of the tread with the ground surface is at a distance of at least 25% of a width of the tread from a centerline of the tread.

2. The non-pneumatic tire of claim 1, wherein a ratio of a width of the non-pneumatic tire over an outer diameter of the non-pneumatic tire is no more than 25%.

3. The non-pneumatic tire of claim 1, wherein the rated load of the non-pneumatic tire is no more than 80 kg$_f$.

4. The non-pneumatic tire of claim 1, wherein the annular support is resiliently deformable such that, when the non-pneumatic tire is loaded, an upper portion of the annular support above an axis of rotation of the non-pneumatic tire is in tension.

5. The non-pneumatic tire of claim 1, wherein the annular support comprises a plurality of spokes deformable such that, when the non-pneumatic tire is loaded, upper ones of the spokes located above an axis of rotation of the non-pneumatic tire are in tension.

6. The non-pneumatic tire of claim 5, wherein adjacent ones of the spokes diverge or converge from the annular beam towards an axis of rotation of the non-pneumatic tire.

7. The non-pneumatic tire of claim 1, wherein the non-pneumatic tire allows a ratio of a radial deflection of the non-pneumatic tire over a radius of the non-pneumatic tire of at least 18%.

8. The non-pneumatic tire of claim 1, wherein when the ground surface is substantially flat and the camber angle of the non-pneumatic tire is 10 degrees, the tangent point of the tread with the ground surface is at a distance of at least 40% of the width of the tread from the centerline of the tread.

9. The non-pneumatic tire of claim 1, wherein a coefficient of rolling resistance of the non-pneumatic tire is no more than 0.10.

10. The non-pneumatic tire of claim 1, wherein: the annular beam comprises an outer annular portion, an inner annular portion, and a shearing annular portion between the outer annular portion and the inner annular portion of the annular beam; the outer annular portion, the inner annular portion, and the shearing annular portion of the annular beam are elastomeric; and at least one of the outer annular portion and the inner annular portion of the annular beam is free of substantially inextensible reinforcement running in a circumferential direction of the annular beam.

11. The non-pneumatic tire of claim 1, wherein the annular beam is configured to deflect more by shearing than by bending at the contact patch of the non-pneumatic tire.

12. The non-pneumatic tire of claim 11, wherein the annular beam comprises a plurality of formations distributed in a circumferential direction of the annular beam and arranged to cause the annular beam to deflect more by shearing than by bending at the contact patch of the non-pneumatic tire.

13. The non-pneumatic tire of claim 12, wherein the formations comprise voids.

14. The non-pneumatic tire of claim 11, wherein a ratio of a transverse deflection of the annular beam due to shear over a transverse deflection of the annular beam due to bending at a center of a design contact length at the contact patch of the non-pneumatic tire is at least 2 when the ground surface is substantially flat.

15. The non-pneumatic tire of claim 1, wherein the vehicle is a bicycle.

16. A wheel comprising the non-pneumatic tire of claim 1, comprising a hub extending radially inwardly from the annular support.

17. The wheel of claim 16, wherein the hub comprises an outer rim, an inner hub member, and a plurality of support members connecting the outer rim and the inner hub member and spaced apart from one another in a circumferential direction of the wheel.

18. The wheel of claim 1, wherein a material of the hub is stiffer than a material of the non-pneumatic tire.

19. The wheel of claim 16, wherein the annular beam, the annular support and the hub are molded together.

20. The wheel of claim 16, wherein the hub and the non-pneumatic tire are configured to be attached to one another mechanically such that the non-pneumatic tire is mountable to and dismountable from the hub.

21. The non-pneumatic tire of claim 1, the annular support being resiliently deformable such that, when the non-pneumatic tire is loaded, an upper portion of the annular support above an axis of rotation of the non-pneumatic tire is in tension.

22. The non-pneumatic tire of claim 1, wherein the non-pneumatic tire comprises a tire material constituting at least a majority of the annular beam; and the tire material is at least mostly non-elastomeric.

23. The non-pneumatic tire of claim 1, wherein the non-pneumatic tire comprises a tire material constituting at least a majority of the annular beam; and the tire material comprises polyamide.

24. The non-pneumatic tire of claim 1, wherein the non-pneumatic tire comprises a tire material constituting at least a majority of the annular beam; and the tire material comprises a polyamide-based alloy.

25. The non-pneumatic tire of claim 1, wherein the annular beam comprises a first plurality of blind openings that extend from a first lateral side of the annular beam without reaching a second lateral side of the annular beam that is opposite to the first lateral side of the annular beam and a second plurality of blind openings that extend from the second lateral side of the annular beam without reaching the first lateral side of the annular beam.

26. The non-pneumatic tire of claim 1, wherein the annular beam comprises a plurality of openings and a plurality of interconnecting members between respective ones of the openings; and each interconnecting member includes a first end portion, a second end portion, and an intermediate portion that is disposed between the first end portion and the second end portion of the interconnecting member and is narrower than the first end portion and the second end portion of the interconnecting member in a circumferential direction of the non-pneumatic tire.

* * * * *

UNITED STATES PATENT AND TRADEMARK OFFICE
CERTIFICATE OF CORRECTION

PATENT NO. : 12,397,586 B2  
APPLICATION NO. : 17/276363  
DATED : August 26, 2025  
INVENTOR(S) : Ronald H. Thompson Page 1 of 1

It is certified that error appears in the above-identified patent and that said Letters Patent is hereby corrected as shown below:

In the Specification

In Column 16, Line 53: "twist angle $\beta$" should be corrected to read "twist angle $\varphi$"

In Column 19, Line 51: "The wheel $20_1$" should be corrected to read "The wheel $20_i$"

Signed and Sealed this  
Eleventh Day of November, 2025

John A. Squires  
*Director of the United States Patent and Trademark Office*